(12) United States Patent
Tischhauser

(10) Patent No.: US 11,332,238 B2
(45) Date of Patent: May 17, 2022

(54) ENERGY ABSORBING LANDING GEAR SYSTEM FOR A VERTICAL LANDING APPARATUS AND METHOD OF USING THE SAME

(71) Applicant: Aurora Flight Sciences Corporation, Manassas, VA (US)

(72) Inventor: Frederick Tischhauser, Bottmingen (CH)

(73) Assignee: Aurora Flight Sciences Corporation, Manassas, VA (US)

(*) Notice: Subject to any disclaimer, the term of this patent is extended or adjusted under 35 U.S.C. 154(b) by 116 days.

(21) Appl. No.: 16/826,246

(22) Filed: Mar. 22, 2020

(65) Prior Publication Data

US 2021/0291968 A1 Sep. 23, 2021

(51) Int. Cl.
*B64C 25/60* (2006.01)
(52) U.S. Cl.
CPC .................... *B64C 25/60* (2013.01)
(58) Field of Classification Search
CPC .......... B64C 25/60; B64C 25/62; B64C 25/64
See application file for complete search history.

(56) References Cited

U.S. PATENT DOCUMENTS

| | | | | | |
|---|---|---|---|---|---|
| 3,997,133 A | * | 12/1976 | Fagan | ................. | B64C 25/60 244/104 R |
| 4,336,868 A | * | 6/1982 | Wilson | ................. | B64C 25/60 188/376 |
| 4,821,983 A | * | 4/1989 | Aubry | ................. | B64C 25/60 244/104 FP |
| 5,271,314 A | | 12/1993 | Derrien | | |
| 5,294,077 A | * | 3/1994 | Derrien | ................. | B64C 25/60 244/102 R |

(Continued)

FOREIGN PATENT DOCUMENTS

| CN | 103935525 B | 1/2016 |
|---|---|---|
| CN | 106986006 A | 7/2017 |

(Continued)

OTHER PUBLICATIONS

Doengi, F. et al., "Lander Shock-Alleviation Techniques", ESA (European Space Agency) Bulletin 93, Feb. 1998, 10 pages.

(Continued)

*Primary Examiner* — Philip J Bonzell
*Assistant Examiner* — Tye William Abell

(57) ABSTRACT

There is provided an energy absorbing landing gear system for attachment to a vertical landing apparatus. The energy absorbing landing gear system includes a linear damper assembly, and a load limiter assembly coupled to the linear damper assembly, the load limiter assembly having at least one deformable element to enhance an energy absorption capability. When the energy absorbing landing gear system is attached to the vertical landing apparatus, during a landing phase, the linear damper assembly contacts a landing surface, and a piston assembly of the linear damper assembly moves a first compression distance toward the load limiter assembly, and when the linear damper assembly reaches a maximum compression, the linear damper assembly moves a second compression distance into the load limiter assembly, and the at least one deformable element deforms.

20 Claims, 11 Drawing Sheets

(56) References Cited

U.S. PATENT DOCUMENTS

| | | | | |
|---|---|---|---|---|
| 5,547,148 A * | 8/1996 | Del Monte | ............. | B64C 25/60 188/376 |
| 6,328,259 B1 * | 12/2001 | Bolukbasi | ............... | B64C 25/60 188/371 |
| 2009/0218444 A1 * | 9/2009 | Lahargou | ................ | B64C 25/60 244/102 SL |
| 2011/0214601 A1 * | 9/2011 | Martin | .................. | B64D 45/00 116/203 |
| 2016/0052625 A1 * | 2/2016 | Losi | ........................ | B64C 25/64 244/108 |
| 2020/0346743 A1 * | 11/2020 | Bernard | ............. | B64C 29/0091 |

FOREIGN PATENT DOCUMENTS

| | | |
|---|---|---|
| CN | 206900639 U | 1/2018 |
| DE | 4312343 A1 | 10/1994 |
| EP | 0275735 A1 | 7/1988 |
| FR | 3062112 A1 | 7/2018 |
| JP | 2018040120 A | 3/2018 |

OTHER PUBLICATIONS

King Shocks, 3 web pages, from King Shock Technology, Inc., Garden Grove, CA, website web address at http://www.kingshocks.com/products/airshocks/air-shocks/, as of Feb. 19, 2020.

McFarland, Jr., R.K., "The Development of Metal Honeycomb Energy-Absorbing Elements", Technical Report 32-639, Jet Propulsion Laboratory, California Institute of Technology, Pasadena, California, Jul. 24, 1964, 35 pages.

Wikipedia Article on Shock Absorber, 9 web pages, from Wikipedia website web address at https://en.wikipedia.org/wiki/Shock_absorber, as of Feb. 19, 2020.

Plascore, 1 web page for Plascore CrushLite™, from Plascore Incorporated, Zeeland, MI, website web address at https://www.plascore.com/honeycomb/energy-absorbtion/crushlite/, as of Mar. 21, 2020.

Extended European Search Report (EESR), European Patent Office, dated Aug. 4, 2021, for corresponding EP Application No. EP21163934.9, Applicant The Boeing Company, 12 pages.

* cited by examiner

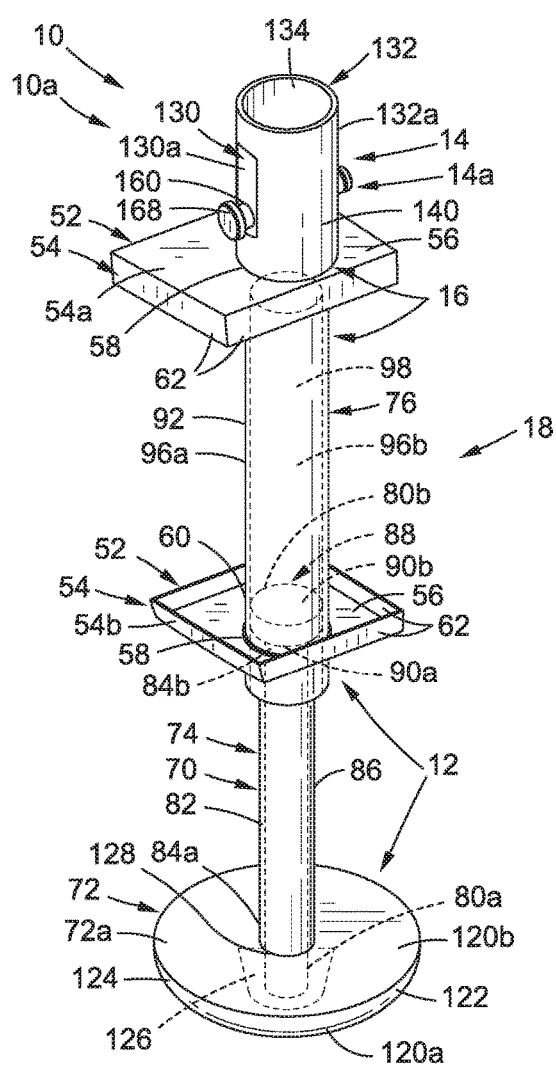
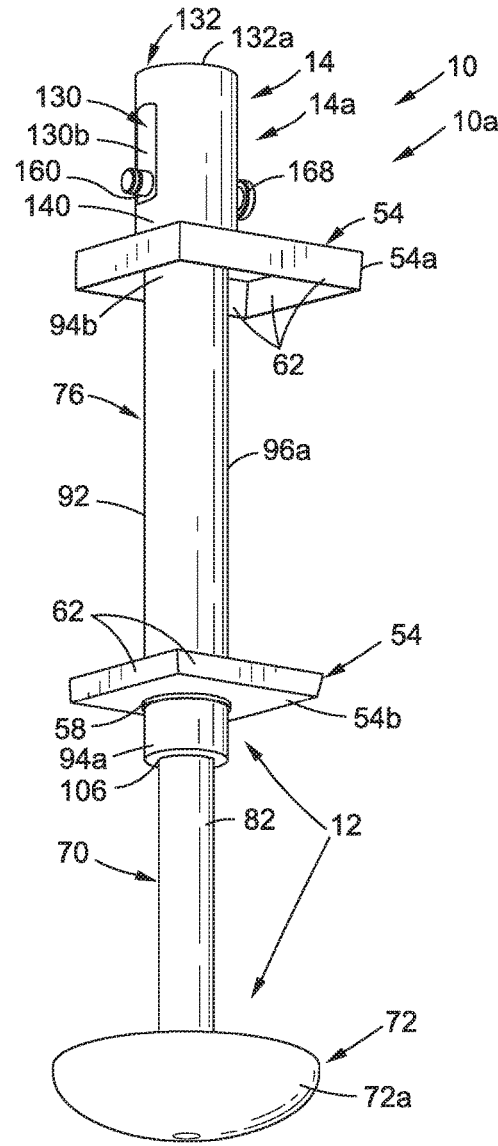
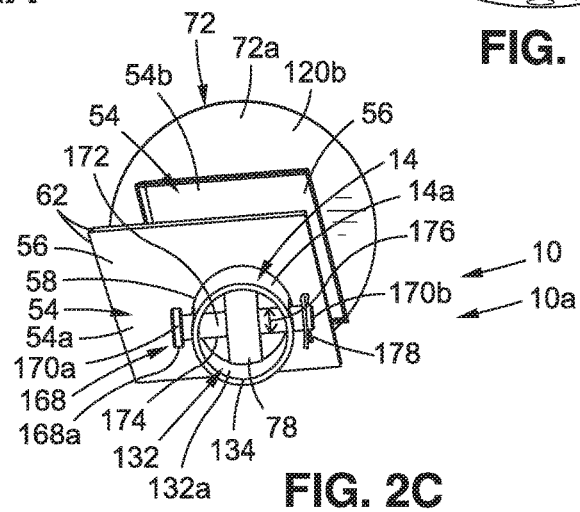

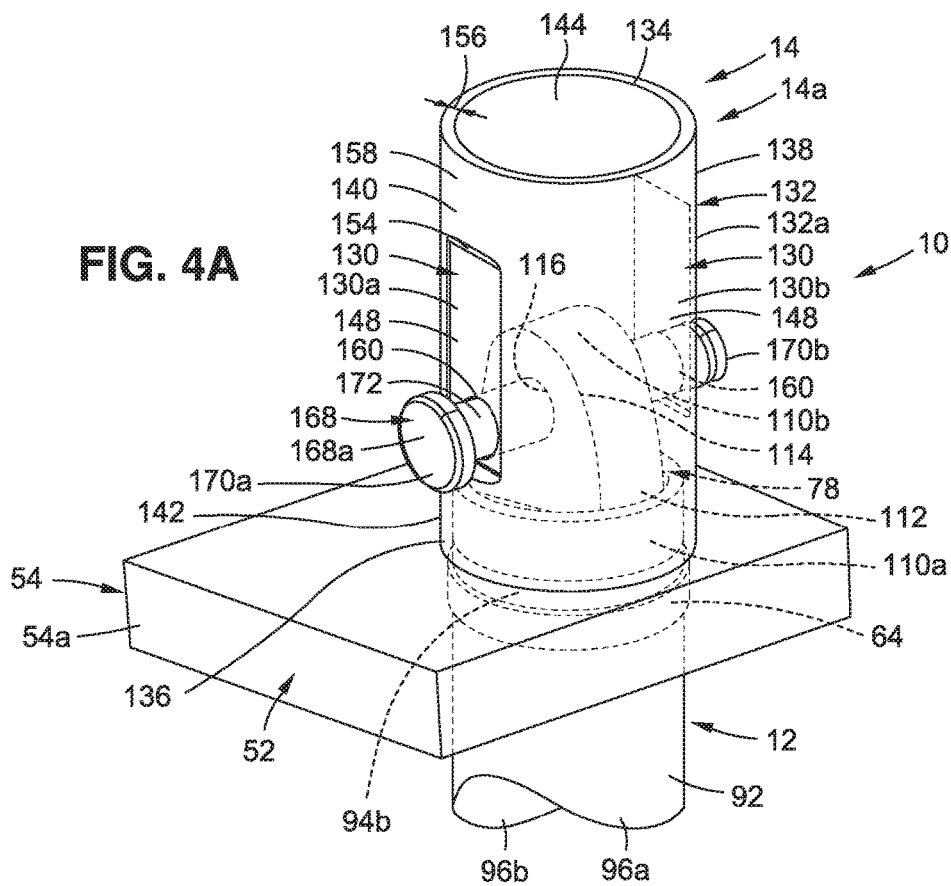
FIG. 4A
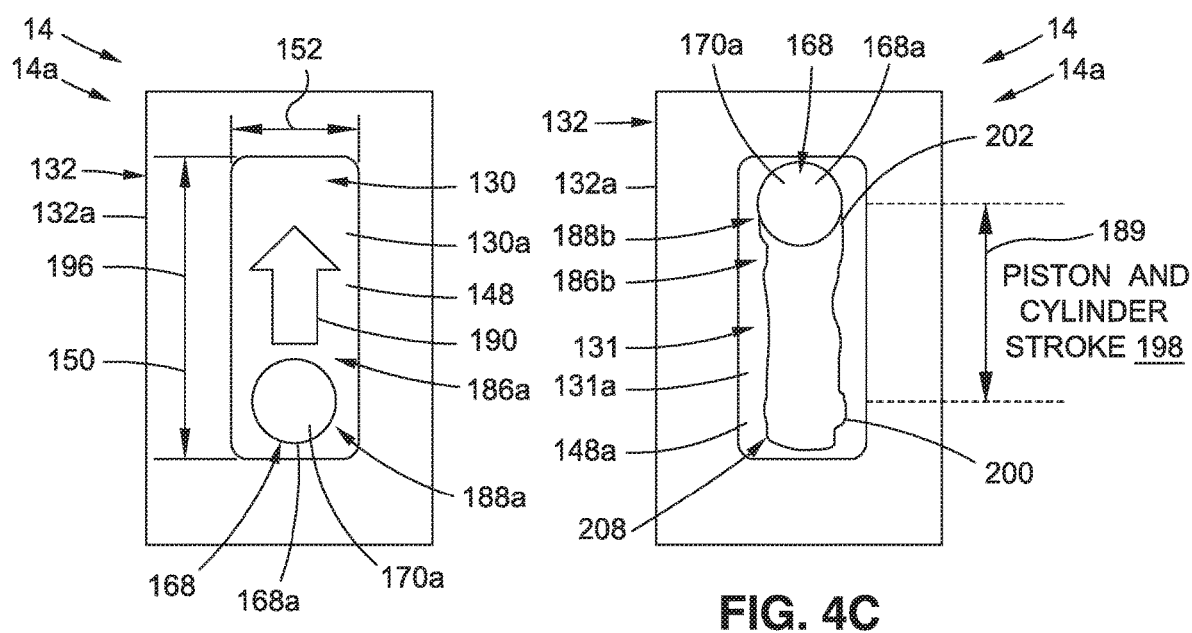
FIG. 4B
FIG. 4C

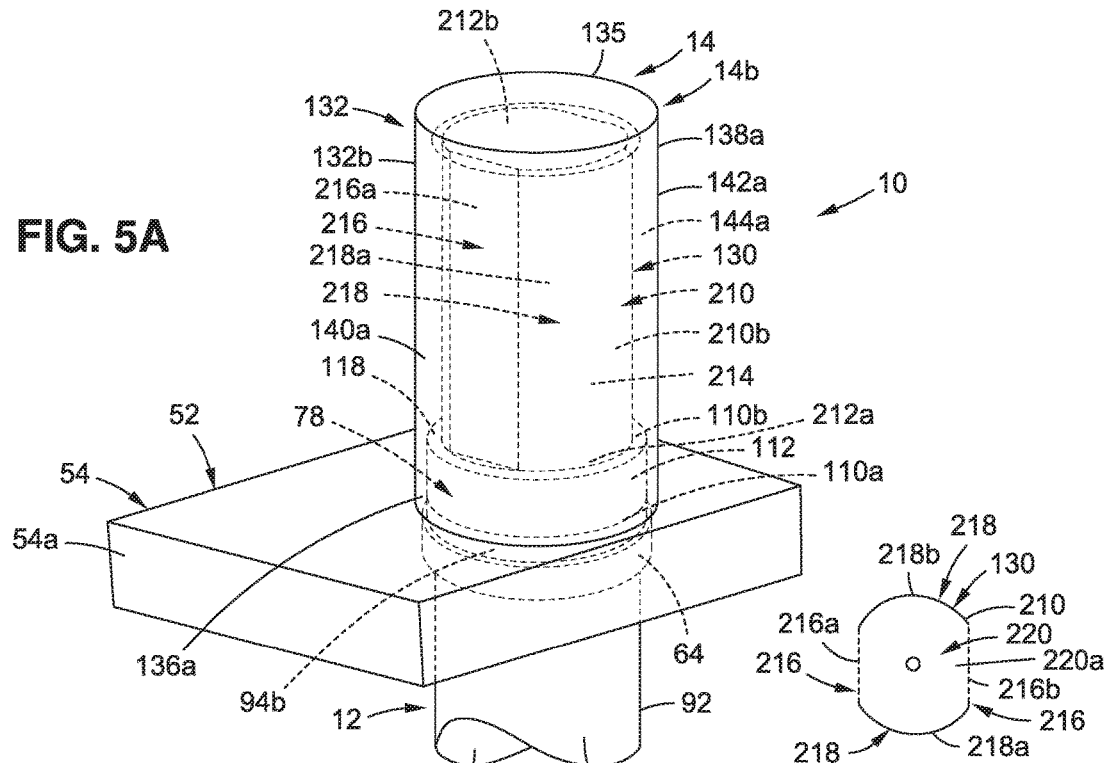
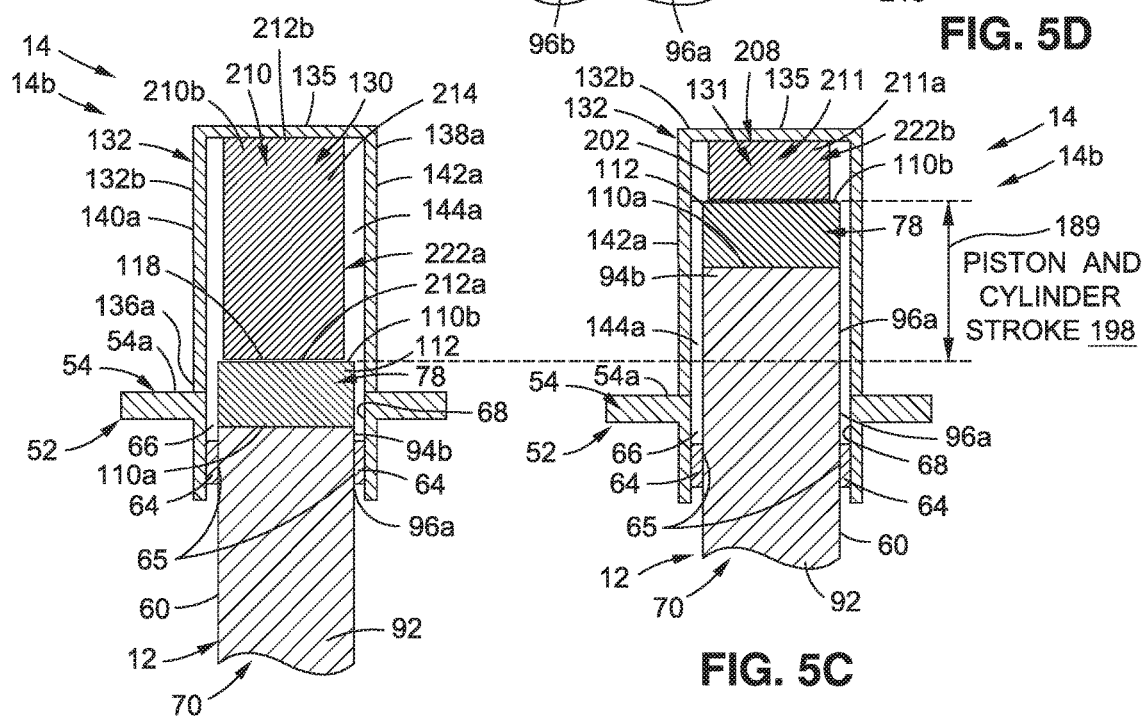

ENERGY ABSORBING LANDING GEAR SYSTEM FOR A VERTICAL LANDING APPARATUS AND METHOD OF USING THE SAME

FIELD

The disclosure relates generally to landing gear systems and methods for a vertical landing apparatus, and more particularly, to energy absorbing landing gear systems and methods for a vertical landing apparatus, such as a vertical landing aircraft.

BACKGROUND

The use of vertical landing apparatus, such as vertical landing aircraft, for example, vertical take-off and landing (VTOL) aircraft, and electric and hybrid-electric vertical take-off and landing aircraft (eVTOLs), has grown in recent years, and such vertical landing aircraft are used in a variety of applications, including both civilian and military uses. Known landing gear systems used with such vertical landing aircraft may include oil-gas dampers or shock absorber systems mounted to the airframe of the vertical landing aircraft. The main purpose of such known landing gear systems is to absorb the impact energy resulting from a vertical landing motion.

However, when the vertical landing aircraft makes a hard landing, for example, when it hits the ground at a vertical speed of greater than 2 m/s (two meters per second) and/or with a force greater than the vertical landing aircraft is designed to handle, such known landing gear systems mounted to the vertical landing aircraft, are not designed to absorb excess load due to the hard landing, and this may result in damage to the vertical landing aircraft. After the hard landing incident, the vertical landing aircraft may need to be temporarily or fully grounded until it can be proven that no damage to the vertical landing aircraft has occurred. This may be a time consuming and costly process.

In addition, after the vertical landing aircraft experiences a hard landing incident, such known landing gear systems mounted to the vertical landing aircraft do not provide a visual indication of the hard landing incident, and thus, an indication of possible damage to the vertical landing aircraft. If the hard landing incident is not noticed or recorded, there is a risk that a damaged vertical landing aircraft continues in operation.

Accordingly, there is a need in the art for a landing gear system for a vertical landing apparatus and method that enhance an energy absorption capability during a landing phase, that provide a visual indicator that the vertical landing apparatus experienced a hard landing, and that provide other advantages over known landing gear systems and methods.

SUMMARY

Example implementations of this disclosure provide energy absorbing landing gear systems and a method of using one or more energy absorbing landing gear systems on a vertical landing apparatus, to enhance an energy absorption capability during a landing phase. As discussed in the below detailed description, versions of the energy absorbing landing gear systems and method may provide significant advantages over existing systems and methods.

In one exemplary version, there is provided an energy absorbing landing gear system for attachment to a vertical landing apparatus. The energy absorbing landing gear system comprises a linear damper assembly.

The energy absorbing landing gear system further comprises a load limiter assembly coupled to the linear damper assembly. The load limiter assembly has at least one deformable element to enhance an energy absorption capability.

When the energy absorbing landing gear system is attached to the vertical landing apparatus, during a landing phase, the linear damper assembly contacts a landing surface, and a piston assembly of the linear damper assembly moves a first compression distance toward the load limiter assembly. When the linear damper assembly reaches a maximum compression, the linear damper assembly moves a second compression distance into the load limiter assembly, and the at least one deformable element deforms.

In another version, there is provided a vertical landing apparatus. The vertical landing apparatus comprises a structural frame. The vertical landing apparatus further comprises one or more energy absorbing landing gear systems, each attached to the structural frame, via one or more attachment members.

Each of the one or more energy absorbing landing gear systems comprises a linear damper assembly. The linear damper assembly comprises a linear damper having a piston assembly coupled to a base member.

Each of the one or more energy absorbing landing gear systems further comprises a load limiter assembly coupled to the linear damper assembly. The load limiter assembly has at least one deformable element. During a landing phase, the base member of the linear damper assembly contacts a landing surface, and the piston assembly moves a first compression distance toward the load limiter assembly. When the linear damper assembly reaches a maximum compression, the linear damper assembly moves a second compression distance into the load limiter assembly, and the at least one deformable element deforms.

In another version, there is provided a method of using one or more energy absorbing landing gear systems attached to a vertical landing apparatus during a landing phase of a vertical landing apparatus. The method comprises the step of operating the vertical landing apparatus to land in a vertical landing motion during the landing phase. The vertical landing apparatus has the one or more energy absorbing landing gear systems attached to a structural frame of the vertical landing apparatus.

Each of the one or more energy absorbing landing gear systems comprises a linear damper assembly comprising a linear damper having a piston assembly coupled to a base member. The base member interfaces with a landing surface. Each of the one or more energy absorbing landing gear systems further comprises a load limiter assembly coupled to the linear damper assembly. The load limiter assembly has at least one deformable element.

The method further comprises the step of moving the piston assembly of the linear damper assembly of each of the one or more energy absorbing landing gear systems, a first compression distance toward the load limiter assembly, when the base member of each of the one or more energy absorbing landing gear systems contacts a landing surface during the landing phase. The method further comprises the step of moving the linear damper assembly of each of the one or more energy absorbing landing gear systems, a second compression distance into the load limiter assembly, when the linear damper assembly reaches a maximum compression.

The method further comprises the step of deforming the at least one deformable element of each of the one or more energy absorbing landing gear systems.

The features, functions, and advantages that have been discussed can be achieved independently in various versions of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein:

FIG. 2A is an illustration of a front perspective view of a version of an energy absorbing landing gear system of the disclosure;

FIG. 2B is an illustration of a back perspective view of the energy absorbing landing gear system of FIG. 2A;

FIG. 2C is an illustration of a top perspective view of the energy absorbing landing gear system of FIG. 2A;

FIG. 4A is an illustration of a front perspective view of a version of a load limiter assembly used in a version of an energy absorbing landing gear system of the disclosure;

FIG. 4B is an illustration of a left side view of the load limiter assembly of FIG. 4A, where a deformable element is in an undeformed position;

FIG. 4C is an illustration of a left side view of the load limiter assembly of FIG. 4A, where a deformed element is in a deformed position;

FIG. 5A is an illustration of a front perspective view of another version of a load limiter assembly used in another version of an energy absorbing landing gear system of the disclosure;

FIG. 5B is an illustration of a side cross-sectional view of a closed tubular fitting and a deformable element of the load limiter assembly of FIG. 5A, where the deformable element is in an undeformed position;

FIG. 5C is an illustration of a side cross-sectional view of the closed tubular fitting of FIG. 5B, and showing a deformed element in a deformed position;

FIG. 5D is a top cross-sectional view of the deformable element of FIG. 5A;

The Figures shown in this disclosure represent various aspects of the versions presented, and only differences will be discussed in detail.

DETAILED DESCRIPTION

Disclosed versions or examples will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "in one version" or "in a version" do not necessarily refer to the same version. Particular features, structures, or characteristics may be combined in any suitable manner consistent with this disclosure.

As used herein, "comprising" is an open-ended term, and as used in the claims, this term does not foreclose additional structure or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used in the claims and herein, the term "or" is used as an inclusive or and not as an exclusive or. For example, the phrase "at least one of x, y, or z" means any one of x, y, and z, as well as any combination thereof.

Figure 1:
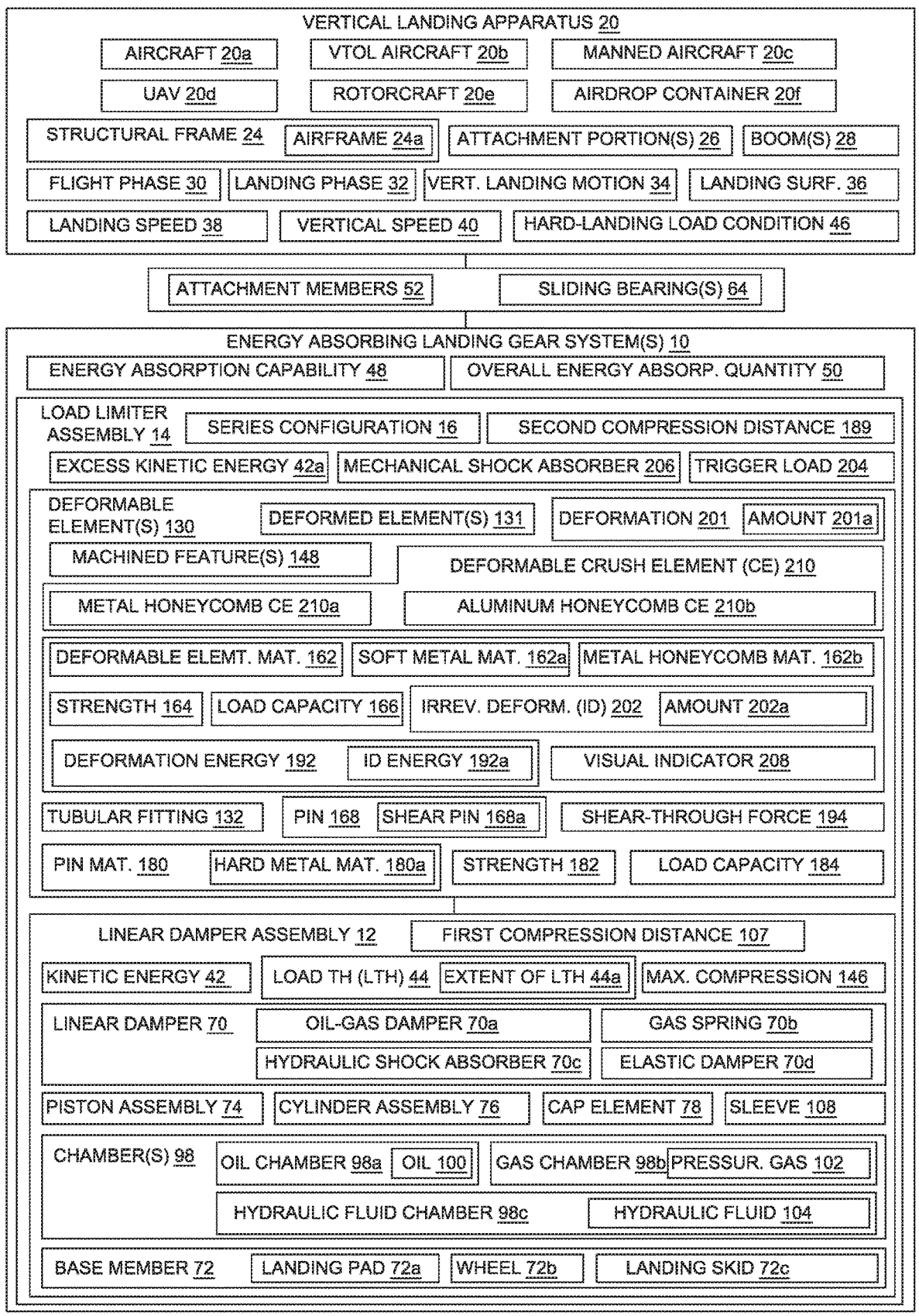
FIG. 1 is an illustration of a functional block diagram showing exemplary versions of an energy absorbing landing gear system of the disclosure, for attachment to a vertical landing apparatus.

Now referring to the Figures, FIG. 1 is an illustration of a functional block diagram showing exemplary versions of an energy absorbing landing gear system 10 of the disclosure, for attachment to a vertical landing apparatus 20. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein.

FIGS. 2A-2C show one version of the energy absorbing landing gear system 10, such as in the form of energy absorbing landing gear system 10a. In particular, FIG. 2A is an illustration of a front perspective view of a version of the energy absorbing landing gear system 10, such as in the form of energy absorbing landing gear system 10a, of the disclosure. FIG. 2B is an illustration of a back perspective view of the energy absorbing landing gear system 10, such as in the form of energy absorbing landing gear system 10a, of FIG. 2A. FIG. 2C is an illustration of a top perspective view of the energy absorbing landing gear system 10, such as in the form of energy absorbing landing gear system 10a, of FIG. 2A.

Figure 3A:
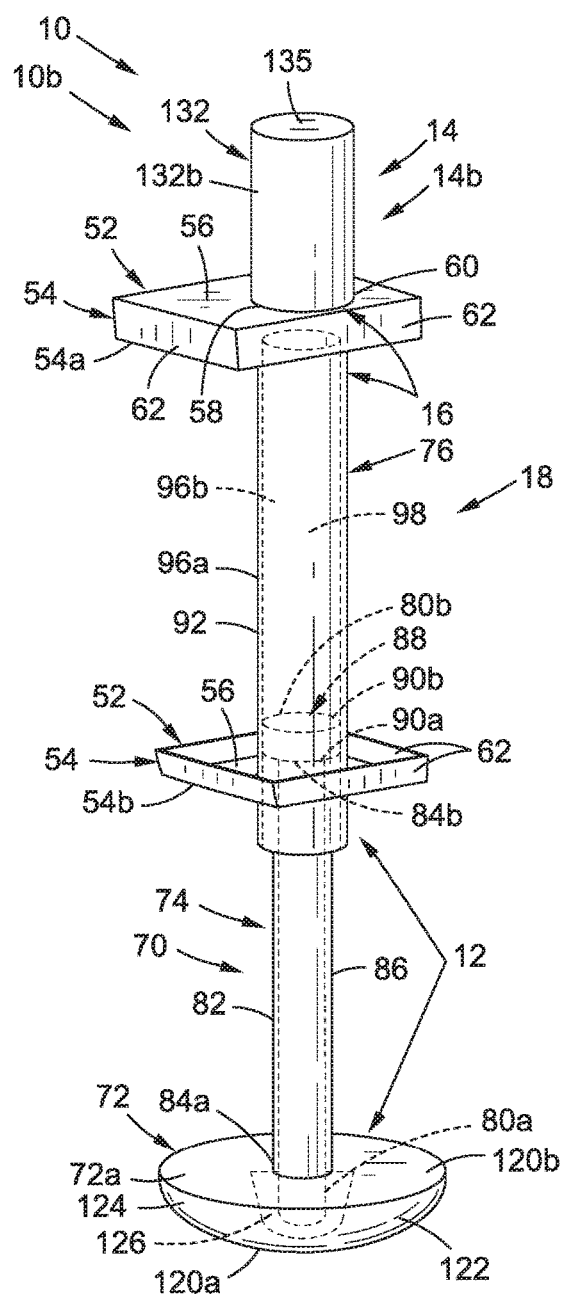
FIG. 3A is an illustration of a front perspective view of another version of an energy absorbing landing gear system of the disclosure.
Figure 3B:
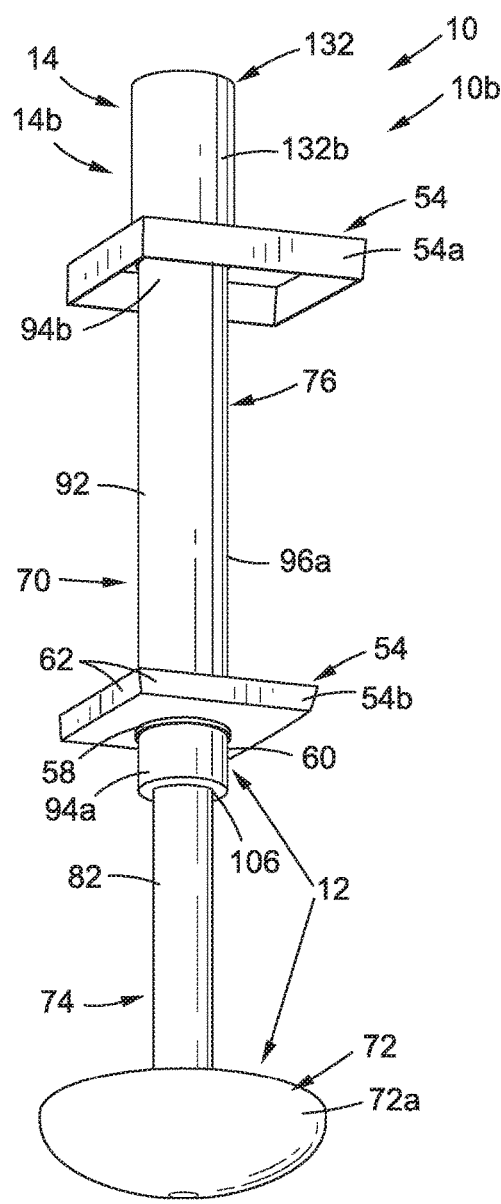
FIG. 3B is an illustration of a back perspective view of the energy absorbing landing gear system of FIG. 3A.

FIGS. 3A-3B show another version of the energy absorbing landing gear system 10, such as in the form of energy absorbing landing gear system 10b. In particular, FIG. 3A is an illustration of a front perspective view of another version of the energy absorbing landing gear system 10, such as in the form of energy absorbing landing gear system 10b, of the disclosure. FIG. 3B is an illustration of a back perspective view of the energy absorbing landing gear system 10, such as in the form of energy absorbing landing gear system 10b, of FIG. 3A.

As shown in FIGS. 1, 2A, 3A, the energy absorbing landing gear system 10 comprises a linear damper assembly 12 and a load limiter assembly 14. The load limiter assembly 14 is coupled or mounted to the linear damper assembly 12. In one version, the load limiter assembly 14 is coupled or mounted, in a series configuration 16 (see FIGS. 1, 2A, 3A), for example, a stacked series configuration, to the linear damper assembly 12. In this version, the load limiter assembly 14 is positioned atop, or over, the load limiter assembly 14, such as when the energy absorbing landing gear system 10 is in a vertical upright position 18 (see FIGS. 2A, 3A) during landing.

Figure 7:
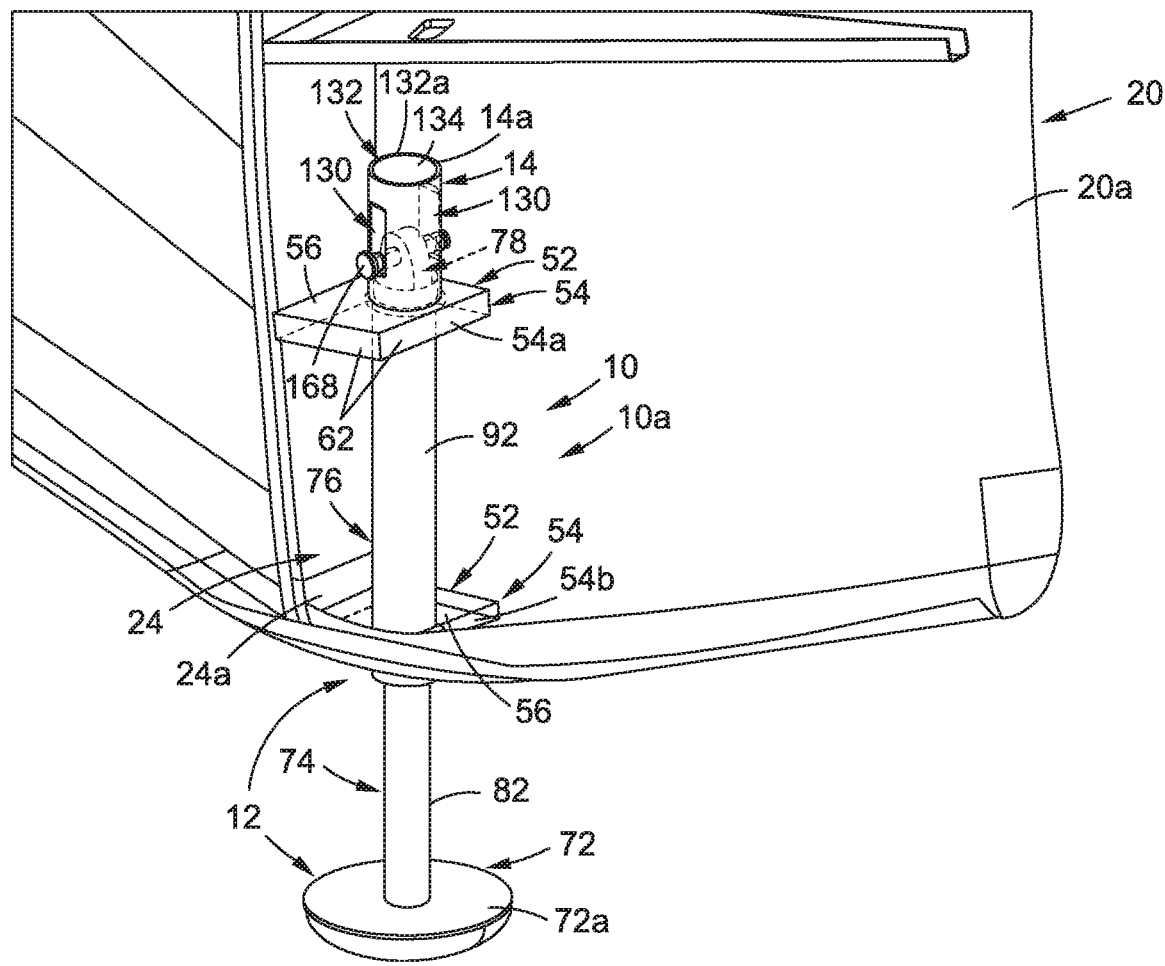
FIG. 7 is a front perspective view of a version of an energy absorbing landing gear system of the disclosure, where the energy absorbing landing gear system is attached to a vertical landing apparatus.
Figure 8:
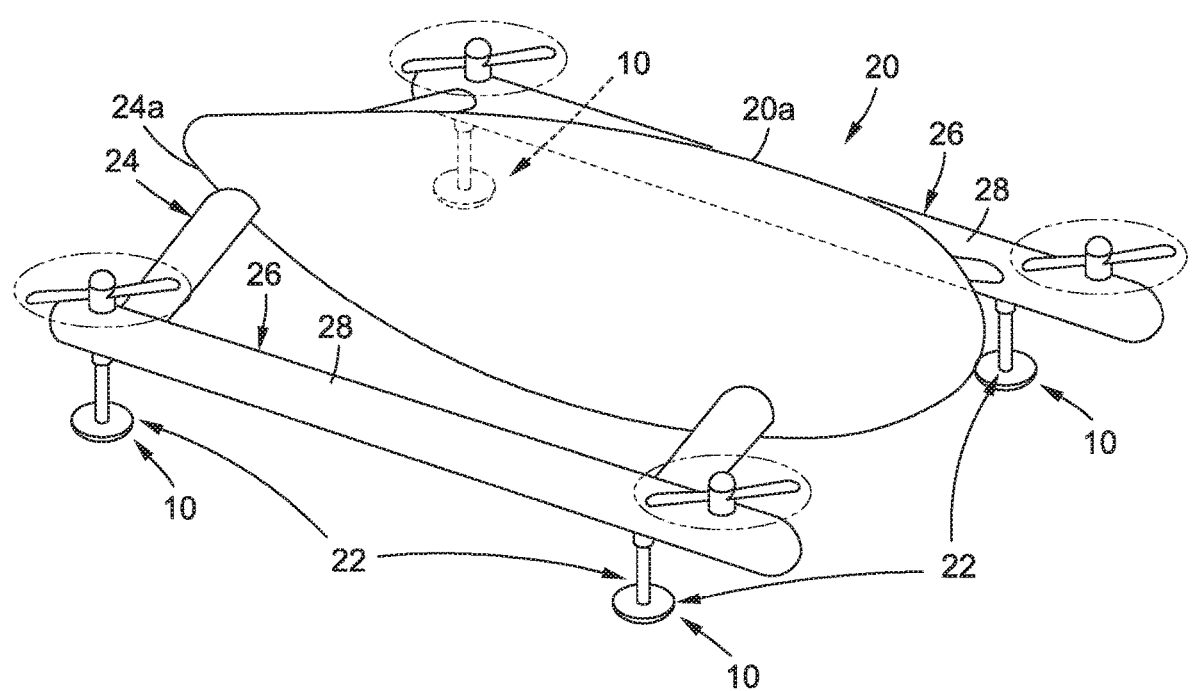
FIG. 8 is a front perspective view of an exemplary version of a vertical landing apparatus having four energy absorbing landing gear systems, as disclosed herein, attached to the vertical landing apparatus.

The energy absorbing landing gear system 10 is attached to, or is configured for attachment to, a vertical landing apparatus 20 (see FIGS. 1, 7, 8). The vertical landing apparatus 20 may have one, two, three, four, or more than four, energy absorbing landing gear systems 10 attached to, and/or installed in, the vertical landing apparatus 20. For example, as shown in FIG. 8, discussed in detail below, in one version, the vertical landing apparatus 20 has four energy absorbing landing gear systems 10 attached to, and installed in, the vertical landing apparatus 20. When there are two or more energy absorbing landing gear systems 10 attached to, or installed in, the vertical landing apparatus 20, the energy absorbing landing gear systems 10 are in a vertical alignment 22 (see FIG. 8) with respect to each other.

As shown in FIG. 1, the vertical landing apparatus 20 may comprise an aircraft 20a, including a vertical take-off and landing (VTOL) aircraft 20b, a manned aircraft 20c, an unmanned aerial vehicle (UAV) 20d, a rotorcraft 20e, or another suitable type of aircraft. As used herein, "vertical take-off and landing (VTOL) aircraft" means an aircraft that can take off vertically and land vertically, and includes VTOL aircraft with powered rotors, VTOL aircraft with jet engines, electric VTOL (eVTOL) aircraft, and hybrid-electric VTOL aircraft. As used herein, "manned aircraft" means an aircraft operated by a human pilot on board the aircraft, and "unmanned aerial vehicle (UAV)" means an aircraft operated without a human pilot on board the aircraft. The unmanned aerial vehicle (UAV) 20d may include a drone, a remote controlled aircraft, an unmanned aircraft system, an unmanned combat aerial vehicle, or another suitable UAV. As shown in FIG. 1, the vertical landing apparatus 20 may further comprise an airdrop container 20f, such as an airdrop package or an airdrop vessel, configured to land vertically with one or more energy absorbing landing gear systems 10 attached.

The vertical landing apparatus 20 comprises a structural frame 24 (see FIGS. 1, 7, 8), such as an airframe 24a (see FIGS. 1, 7, 8), or another suitable structural frame. Each energy absorbing landing gear system 10 is attached to, and/or installed in, the structural frame 24 of the vertical landing apparatus 20. The structural frame 24 may include one or more attachment portions 26 (see FIGS. 1, 8), such as one or more booms 28 (see FIGS. 1, 8), or other suitable attachment portions, for attachment or installation of the one or more energy absorbing landing gear systems 10 to the vertical landing apparatus 20. For example, in one version shown in FIG. 8, the energy absorbing landing gear systems 10 are attached to attachment portions 26, in the form of booms 28, of the structural frame 24 of the vertical landing apparatus 20.

The vertical landing apparatus 20 takes off and flies, or is configured to take off and fly, during a flight phase 30 (see FIG. 1). The vertical landing apparatus 20 lands, or is configured to land, in a landing phase 32 (see FIG. 1), in a vertical landing motion 34 (see FIG. 1), on a landing surface 36 (see FIGS. 1, 6B), such as ground 36a (see FIGS. 1, 6B). The vertical landing apparatus 20 lands at a landing speed 38 (see FIG. 1), such as a vertical speed 40 (see FIG. 1), and upon landing, during the landing phase 32, the linear damper assembly 12 absorbs kinetic energy 42 (see FIG. 1) of the vertical landing apparatus 20. The linear damper assembly 12 can reach a load threshold 44 (see FIG. 1) in a hard-landing load condition 46 (see FIG. 1) during a hard landing of the vertical landing apparatus 20. As used herein, "hard-landing load condition" means when a vertical landing apparatus hits a landing surface, such as the ground, with a vertical speed and a force that is greater than a force the vertical landing apparatus is designed to handle, for example, a vertical speed of greater than 2 m/s (two meters per second). The use of the one or more energy absorbing landing gear systems 10 with the vertical landing apparatus 20 enhances an energy absorption capability 48 (see FIG. 1) and an increase in an overall energy absorption quantity 50 (see FIG. 1) for energy absorption during landing, including a hard-landing load condition 46 during a hard landing.

As shown in FIGS. 1, 2A, 3C, each of the one or more energy absorbing landing gear systems 10 is configured to be attached, and attaches, to the structural frame 24 of the vertical landing apparatus 20, via one or more attachment members 52. The one or more attachment members 52 may comprise one or more structural attachment fittings 54 (see FIGS. 1, 2A-2C, 3A-3B), attachment brackets, attachment couplings, or other suitable attachment members for attaching and securing the one or more energy absorbing landing gear systems 10 to the structural frame 24 of the vertical landing apparatus 20. Each attachment member 52 may be attached to the structural frame 24 of the vertical landing apparatus 20 with a means of attachment, such as by fastening with one or more fastening elements, for example, bolts, rivets, screws, or other suitable fastening elements, or by welding, or by adhesive bonding, or by another suitable means of attachment.

In one version, the one or more attachment members 52 (see FIGS. 2A, 3A) comprise two structural attachment fittings 54, such as in the form of a first structural attachment fitting 54a (see FIGS. 2A-2C, 3A-3B), and a second structural attachment fitting 54b (see FIGS. 2A-2C, 3A-3B). Although two structural attachment fittings 54 are shown, one structural attachment fitting 54, or more than two structural attachment fittings 54 may also be used to attach and secure each energy absorbing landing gear system 10 to the vertical landing apparatus 20. As further shown in this version, each structural attachment fitting 54 comprises a planar surface portion 56 (see FIGS. 2A, 2C, 3A) having a through opening 58 (see FIGS. 2A-2C, 3A-3B), configured to receive and surround, and receiving and surrounding, one or more exterior portions 60 (see FIGS. 2A, 3A-3B) of the linear damper assembly 12 of the energy absorbing landing gear system 10. Although the planar surface portion 56, as shown in FIGS. 2A, 3A, has a rectangle shape, the planar surface portion 56 may have a square shape, or another suitable shape or configuration. In this version, each structural attachment fitting 54 further comprises one or more sides 62 (see FIGS. 2A-2C, 3A-3B) extending from the planar surface portion 56, for example, one or more sides 62 extending substantially perpendicular to the planar surface portion 56. As shown in FIGS. 2A-2C, 3A-3B, each structural attachment fitting 54 has four sides 62. However, each structural attachment fitting 54 may have less than four sides or more than four sides, depending on the chosen shape and configuration of the structural attachment fitting used.

At least one of the one or more sides 62 of the structural attachment fitting 54 is configured to be attached or secured, and attaches or secures, to the structural frame 24 (see FIGS. 1, 7) of the vertical landing apparatus 20 (see FIGS. 1, 7). Alternative to the sides 62 being attached, another portion or portions of the attachment member 52, such as the structural attachment fitting 54, may be attached, or secured, to the structural frame 24 of the vertical landing apparatus 20.

The one or more attachment members 52, such as in the form of one or more structural attachment fitting 54, may also be used with one or more sliding bearings 64 (see FIGS. 1, 4A, 5A-5C). The one or more sliding bearings 64 are preferably disposed or positioned in a space 66 (see FIGS. 5B-5C) between, and in contact with, one or more interior portions 68 (see FIGS. 5B-5C) of each of the one or more attachment members 52 (see FIGS. 5B-5C), such as each of the one or more structural attachment fittings 54 (see FIGS. 5B-5C), and in contact with the one or more exterior portions 60 (see FIGS. 5B-5C) of the linear damper assembly 12 of each of the one or more energy absorbing landing gear systems 10. The one or more sliding bearings 64 preferably comprise one or more low friction sliding bearings positioned in the space 66 between the attachment member 52, such as the structural attachment fitting 54, and the linear damper assembly 12.

As shown in FIGS. 1, 2A, 3A, each energy absorbing landing gear system 10 comprises the linear damper assembly 12. The linear damper assembly 12 comprises a linear damper 70 (see FIGS. 2A-2B, 3A-3B) coupled to a base member 72 (see FIGS. 2A-2C, 3A-3B). As shown in FIG. 1, the linear damper 70 comprises one of, an oil-gas damper 70a, a gas spring 70b, a hydraulic shock absorber 70c, an elastic damper 70d, or another suitable linear damper. As used herein, "linear damper" means a mechanical or hydraulic device designed to absorb and damp shock impacts, by converting kinetic energy of the shock impact into another form of energy, such as deformation energy or heat. The linear damper 70 may also be referred to as a linear shock absorber. The linear damper assembly 12, including the linear damper 70, absorbs kinetic energy 42 (see FIG. 1) from the vertical landing motion 34 (see FIG. 1) of the vertical landing apparatus 20 on the landing surface 36 (see FIGS. 1, 6B), such as the ground 36a (see FIGS. 1, 6B).

In one version, the linear damper 70 comprises at least a piston assembly 74 (see FIGS. 1, 2A, 3A-3B), a cylinder assembly 76 (see FIGS. 1, 2A-2B, 3A-3B) coupled to the piston assembly 74, and a cap element 78 (see FIGS. 1, 4A, 5A) coupled to, and atop, the cylinder assembly 76. In one version, as shown in FIGS. 2A, 3A, the piston assembly 74 of the linear damper 70 comprises a first end 80a and a second end 80b, and comprises a piston rod 82 having a first end 84a, a second end 84b, and a body 86 formed between the first end 84a and the second end 84b. The first end 84a of the piston rod 82 is coupled, or attached, to the base member 72 (see FIGS. 2A, 3A). As shown in FIGS. 2A, 3A, the piston assembly 74 further comprises a piston 88 having a first end face 90a and a second end face 90b. The first end face 90a of the piston 88 is coupled, or attached, to the second end 84b of the piston rod 82. The second end face 90b of the piston 88 is configured to interact, and interacts, with the cap element 78 (see FIGS. 4A, 5A). The piston 88 may be in the form of a disk, a cylinder, or another suitable form or configuration. The piston 88 and the piston rod 82 are preferably made of a metal material, such as aluminum, aluminum alloy, or another suitable metal material. The piston rod 82 is configured to translate or move, and translates or moves, in and out of the cylinder assembly 76, and the piston rod 82 is configured to move, and moves, the piston 88 up and down within the cylinder assembly 76. The piston assembly 74 may further comprise one or more of, valves, valve shims, ports, seals including O-rings, or other piston assembly components known in the art.

As shown in FIGS. 2A-2B, 3A-3B, the cylinder assembly 76 of the linear damper 70 comprises a cylinder 92, such as a shock cylinder. The cylinder 92 has a first end 94a (see FIGS. 2B, 3B), a second end 94b (see FIGS. 2B, 3B), an exterior 96a (see FIGS. 2A-2B, 3A-3B), an interior 96b (see FIGS. 2A, 3A), and one or more chambers 98 (see FIGS. 1, 2A, 3A) disposed in the interior 96b. When the linear damper 70 comprises an oil-gas damper 70a (see FIG. 1), the chambers 98 (see FIG. 1) comprise an oil chamber 98a (see FIG. 1) filled with an oil 100 (see FIG. 1), for example, silicone oil, and a gas chamber 98b (see FIG. 1) filled with a pressurized gas 102 (see FIG. 1), or compressed gas, for example, nitrogen gas. When the linear damper 70 comprises a gas spring 70b (see FIG. 1), the chamber 98 comprises the gas chamber 98b filled with the pressurized gas 102, or compressed gas, for example, nitrogen gas. The gas spring 70b uses pressurized gas 102, or compressed gas, contained within the gas chamber 98b of the cylinder 92 sealed by the piston 88 that translates, or moves, up and down within the cylinder 92, to pneumatically store potential kinetic energy and withstand external force applied parallel to the direction of the piston rod 82. When the linear damper 70 comprises a hydraulic shock absorber 70c (see FIG. 1), the chamber 98 comprises a hydraulic fluid chamber 98c (see FIG. 1) filled with a hydraulic fluid 104 (see FIG. 1).

As shown in FIGS. 2A, 3A, the cylinder 92 houses the piston 88 and the second end 84b of the piston rod 82 in the interior 96b of the cylinder 92. The first end 94a (see FIGS. 2B, 3B) of the cylinder 92 has an opening 106 (see FIGS. 2B, 3B) configured to receive, and receiving, substantially the piston rod 82, when the piston rod 82 translates, or moves, into the interior 96b of the cylinder 92, during the landing phase 32 of the vertical landing apparatus 20.

During the landing phase 32, when the energy absorbing landing gear system 10 is attached to the vertical landing apparatus 20, the base member 72 of the linear damper assembly 12 contacts the landing surface 36, such as the ground 36a, and the piston assembly 74 of the linear damper assembly 12 moves a first compression distance 107 (see FIGS. 1, 6B) toward the load limiter assembly 14. As used herein, "first compression distance" means a distance that the piston assembly 74, including the piston rod 82 and the piston 88, moves and compresses upwardly into the interior 96b of the cylinder 92 of the cylinder assembly 76 toward the load limiter assembly 14.

The cylinder 92 is preferably made of a metal material, such as aluminum, aluminum alloy, stainless steel, or another suitable metal material. The cylinder assembly 76 may further comprise a sleeve 108 (see FIG. 1), for example, a carbon tube sleeve, surrounding or enclosing a portion, or all of, the exterior 96a of the cylinder 92. The cylinder assembly 76 may further comprise one or more of, valves, valve shims, ports, seals including O-rings, or other cylinder assembly components known in the art.

Figure 6A:
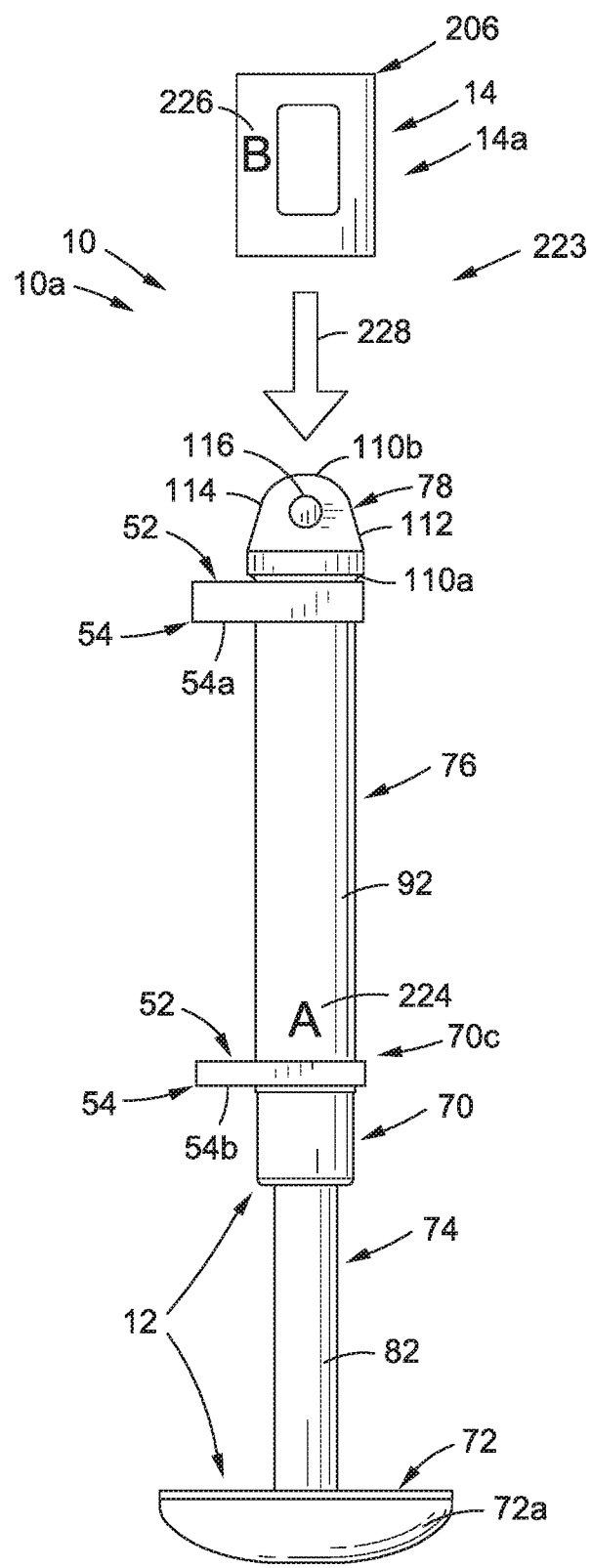
FIG. 6A is an illustration of a side view of an energy absorbing landing gear system of the disclosure, in an unassembled arrangement, with a load limiter assembly separated from a linear damper assembly.

The cap element 78 (see FIGS. 1, 4A, 5A, 6A) of the linear damper 70 (see FIGS. 1, 6A) is attached to, or mounted on, the second end 94b (see FIGS. 4A, 5A-5B) of the cylinder 92. In one version, as shown in FIGS. 4A, 5A-5C, 6A, the cap element 78 of the linear damper 70 comprises a first end 110a, a second end 110b, and a body 112 formed between the first end 110a and the second end 110b. In one version, as shown in FIGS. 4A, 6A, the second end 110b of the cap element 78 comprises a curved portion 114 with a through opening 116. In another version, as shown in FIGS. 5A-5B, the second end 110b of the cap element 78 comprises a flat surface interface 118. The first end 110a of the cap element 78 is configured to interface, and interfaces, with the second end 94b of the cylinder 92, and the first end 110a of the cap element 78 is also configured to interface, and interfaces, with the second end 80b (see FIGS. 2A, 3A) of the piston assembly 74 (see FIGS. 2A, 3A), for example, the second end face 90b (see FIGS. 2A, 3A) of the piston 88 (see FIGS. 2A, 3A), to enhance energy absorption capability 48 (see FIG. 1), or damping capability, to the linear damper assembly 12. When the exterior 96a (see FIGS. 2B, 3B) of the cylinder 92 (see FIGS. 2B, 3B) is surrounded by the sleeve 108 (see FIG. 1), the first end 110a of the cap element 78 may also be configured to interface, and interfaces, with a top portion of the sleeve 108. The cap element 78 (see FIGS. 4A, 5A) is coupled to, and positioned within, the load limiter assembly 14.

As further shown in FIG. 1, the base member 72 comprises one of, a landing pad 72a, a wheel 72b, a landing skid 72c, or another suitable base member. In one version, as shown in FIGS. 2A, 3A, the base member 72 comprises a landing pad 72a having a bottom end 120a, a top end 120b, a body 122 formed between the bottom end 120a and the top end 120b, an exterior 124, and an interior 126. As shown in FIGS. 2A, 3A, a central hole 128 is formed through the top end 120b into the interior 126 of the base member 72. The central hole 128 is configured to receive, and receives, the first end 80a (see FIGS. 2A, 3A) of the piston assembly 74 (see FIGS. 2A, 3A). The bottom end 120a (see FIGS. 2A, 3A, 6B) of the base member 72 of the energy absorbing landing gear system 10 is configured to interface, and interfaces, with the landing surface 36 (see FIG. 6B), such as the ground 36a (see FIG. 6B), during the landing phase 32 (see FIGS. 1, 6B) of the vertical landing apparatus 20 (see FIG. 1).

The energy absorbing landing gear system 10 further comprises the load limiter assembly 14 (see FIGS. 1, 2A-2C, 3A-3B). The load limiter assembly 14 is coupled to the cylinder 92 (see FIGS. 2A, 3A). In one version, the load limiter assembly 14 is coupled in the series configuration 16 (see FIGS. 1, 2A, 3A) to the cylinder 92 (see FIGS. 2A, 3A) of the linear damper assembly 12 (see FIGS. 1, 2A, 3A). As shown in FIGS. 2A, 3A, the load limiter assembly 14 is attached to, or integrated into, the attachment member 52, such as the structural attachment fitting 54, for example, the first structural attachment fitting 54a.

The load limiter assembly 14 comprises at least one deformable element 130 (see FIGS. 1, 2A-2B, 4A, 5A), to enhance the energy absorption capability 48 (see FIG. 1). The load limiter assembly 14 further comprises a tubular fitting 132 (see FIGS. 1, 2A-2B, 3A-3B, 4A, 5A-5C) incorporating the at least one deformable element 130, or housing the at least one deformable element 130, or otherwise coupled to, the at least one deformable element 130. FIGS. 1, 2A-2C, 4A, show one version of the load limiter assembly 14, such as in the form of a first load limiter assembly 14a. FIGS. 1, 3A-3B, 5A-5B, show another version of the load limiter assembly 14, such as in the form of a second load limiter assembly 14b.

Now referring to FIGS. 4A-4C, FIGS. 4A-4C show in further detail the load limiter assembly 14, such as in the form of the first load limiter assembly 14a. In particular, FIG. 4A is an illustration of a front perspective view of a version of the load limiter assembly 14, such as in the form of the first load limiter assembly 14a, that may be used in a version of the energy absorbing landing gear system 10 of the disclosure. As shown in FIG. 4A, the load limiter assembly 14, such as in the form of the first load limiter assembly 14a, comprises the tubular fitting 132, such as in the form of an open tubular fitting 132a, having an open top 134 (see also FIG. 2A). As further shown in FIG. 4A, the tubular fitting 132, such as the open tubular fitting 132a, has a first end 136, a second end 138, a tubular body 140 formed between the first end 136 and the second end 138, an exterior 142, and an interior 144. The interior 144 of the tubular fitting 132 is open or hollow, and when the load limiter assembly 14 is coupled, or attached, to the linear damper assembly 12, the tubular fitting 132 is configured to receive and house, and receives and houses, the cap element 78 (see FIG. 4A) of the linear damper assembly 12. In one version, the interior 144 of the tubular fitting 132 is further configured to receive, and receives, the second end 80b (see FIG. 2A) of the piston assembly 74 (see FIG. 2A) and the second end 94b (see FIGS. 2A, 4A) of the cylinder 92 (see FIGS. 2A, 4A), when the linear damper assembly 12 reaches a maximum compression 146 (see FIG. 1), and an excess kinetic energy 42a (see FIG. 1) causes the linear damper assembly 12 to translate, or move, into the load limiter assembly 14, for example, to translate, or move, upward into the load limiter assembly 14, during the landing phase 32 of the vertical landing apparatus 20.

As shown in FIGS. 2A, 4A, the tubular fitting 132, such as the open tubular fitting 132a, incorporates the at least one deformable element 130 formed in and/or on the tubular body 140. In one version, the at least one deformable element 130 comprises two deformable elements 130a (see FIGS. 2A, 4A), 130b (see FIGS. 2B, 4A), formed in and on the tubular body 140, and aligned opposite each other on the tubular body 140 of the tubular fitting 132. Each of the two deformable elements 130a, 130b, may be in the form of a machined feature 148 (see FIGS. 1, 4A-4B), for example, a machined vertical rectangle, or another suitable machined feature shape. The two deformable elements 130a, 130b, such as in the form of the machined features 148, are preferably the same shape and size, and each deformable element 130, such as the machined feature 148, has a length 150 (see FIG. 4B), a width 152 (see FIG. 4B), and a thickness 154 (see FIG. 4A). It is preferable to have the length 150 of the deformable element 130 be sufficiently long so as to maximize the amount of energy absorbed by the deformable element 130 and to provide a longest possible deformation length. The length 150 and geometry of the deformable element 130 is determined and balanced against a desired weight of the energy absorbing landing gear system 10. The thickness 154 of each deformable element 130a, 130b, such as in the form of the machined features 148, is less than, or thinner than, a thickness 156 (see FIG. 4A) of a remaining portion 158 (see FIG. 4A) of the tubular body 140 (see FIG. 4A) that does not comprise the two deformable elements 130a, 130b. As further shown in FIGS. 2A-2B, 4A, each of the two deformable elements 130a, 130b, such as in the form of machined features 148 (see FIG. 4A), have a through opening 160 formed through a portion of each of the two deformable elements 130a, 130b.

The at least one deformable element 130, such as each of the two deformable elements 130a, 130b, is preferably made of a deformable element material 162 (see FIG. 1) having a strength 164 (see FIG. 1) and a load capacity 166 (see FIG. 1). Preferably, the deformable element material 162 (see FIG. 1) comprises a soft metal material 162a (see FIG. 1), that is easily deformable and cut, for example, aluminum, copper, or another suitably soft metal material. The remaining portion 158 of the tubular body 140 that does not comprise the two deformable elements 130a, 130b, is preferably made of the same soft metal material 162a as the deformable element material 162, for example, aluminum, copper, or another suitably soft metal material, except that the thickness 156 of the remaining portion 158 of the tubular body 140 is greater than the thickness 154 of each of the two deformable elements 130a, 130b, which are preferably machined to be made thinner.

As shown in FIGS. 2A-2C, 4A, the load limiter assembly 14, such as in the form of the first load limiter assembly 14a, further comprises a pin 168 configured for insertion, and inserted, through each through opening 160 of the two deformable elements 130a, 130b. As shown in FIG. 4A, the pin 168 is also configured for insertion, and inserted, through the through opening 116 of the cap element 78, so that that pin 168 is coupled to the two deformable elements 130a, 130b of the tubular fitting 132, and is further coupled to the cap element 78 of the linear damper assembly 12. The pin 168 may comprise a shear pin 168a (see FIGS. 2A-2B, 4A-4C), or another suitable type of pin. Alternatively, a bolt, a rod, or another suitable cylindrical mechanical element that is configured for insertion, and inserted, through each through opening 160 of the two deformable elements 130a, 130b, and through the through opening 116 of the cap element 78, may be used. In this version, the pin 168, such as in the form of the shear pin 168a, is designed to shear, or tear, through the two deformable elements 130a, 130b.

As shown in FIGS. 2C, 4A, in an exemplary version, the pin 168, such as the shear pin 168a, comprises a head end 170a, a tail end 170b, and a cylindrical shaft 172 formed between the head end 170a and the tail end 170b. The cylindrical shaft 172 has an exterior 174 (see FIG. 2C) and a diameter 176 (see FIG. 2C). When the pin 168, such as the shear pin 168a, is coupled to the two deformable elements 130a, 130b of the tubular fitting 132, and to the cap element 78, the cylindrical shaft 172 of the pin 168, such as the shear pin 168a, is inserted through the through opening 160 of the deformable element 130a, is then inserted through the through opening 116 of the cap element 78, and is then inserted through the through opening 160 of the deformable element 130b. A retaining element 178 (see FIG. 2C) may optionally be coupled or attached to the tail end 170b (see FIG. 2C) of the pin 168 (see FIG. 2C), if desired, to further facilitate retaining or securing the pin 168 in place. The retaining element 178 may be in the form of a cotter pin, a clip, or another suitable retaining element.

The pin 168, such as the shear pin 168a, is made of a pin material 180 (see FIG. 1) having a strength 182 (see FIG. 1) and a load capacity 184 (see FIG. 1). The pin material 180 (see FIG. 1) comprises a hard metal material 180a (see FIG. 1), for example, steel, stainless steel, titanium, or another suitably hard metal material. The strength 182 of the pin material 180 forming the pin 168, such as the shear pin 168a, is greater than the strength 164 of the deformable element material 162 forming the at least one deformable element 130, such as the two deformable elements 130a, 130b. In addition, the load capacity 184 of the pin material 180 forming the pin 168, such as the shear pin 168a, is greater than the load capacity 166 of the deformable element material 162 forming the at least one deformable element 130, such as the two deformable elements 130a, 130b. The pin material 180 selected to form the pin 168, such as the shear pin 168a, has a strength 182 sufficient to tear through the deformable element material 162 forming the at least one deformable element 130, such as the two deformable elements 130a, 130b, without the pin 168, such as the shear pin 168a, breaking. Further, the pin material 180 selected to form the pin 168, such as the shear pin 168a, is preferably resistant to fatigue, and when subjected to small forces insufficient to break the pin 168, the pin 168 is not damaged. Similarly, if a bolt, a rod, or another suitable cylindrical mechanical element is used instead of the pin 168, the strength and load capacity of the material or materials forming each of the bolt, rod, or other suitable cylindrical mechanical element, is greater than the strength 164 and the load capacity 166 of the deformable element material 162 forming the at least one deformable element 130, such as the two deformable elements 130a, 130b.

Now referring to FIG. 4B, FIG. 4B is an illustration of a left side view of the load limiter assembly 14, such as the first load limiter assembly 14a, of FIG. 4A, where the deformable element 130, such as deformable element 130a, for example, in the form of machined feature 148, is in an undeformed position 186a. FIG. 4B further shows the head end 170a of the pin 168, such as the shear pin 168a, and shows the pin 168, such as the shear pin 168a, in a start position 188a. During the landing phase 32 of the vertical landing apparatus 20, the linear damper assembly 12 absorbs kinetic energy 42 (see FIG. 1) from the vertical landing motion 34 (see FIG. 1) of the vertical landing apparatus 20 (see FIG. 1), and when the linear damper assembly 12 reaches the maximum compression 146 (see FIG. 1), for example, when the piston assembly 74 (see FIG. 2A), including the piston rod 82 (see FIG. 2A) and the piston 88 (see FIG. 2A), of the linear damper assembly 12, are fully compressed, the linear damper assembly 12 moves a second compression distance 189 (see FIGS. 1, 4C, 5C, 6B) upwardly into the load limiter assembly 14, and the at least one deformable element 130, such as the two deformable elements 130a, 130b, deform. As used herein, "second compression distance" means a distance that the linear damper assembly 12, including the piston assembly 74 and the cylinder assembly 76, moves and compresses upwardly into the load limiter assembly 14, for example, into the interior 144 (see FIG. 4A) of the tubular fitting 132, such as the open tubular fitting 132a (see FIG. 4A), of the load limiter assembly 14, such as the first load limiter assembly (see FIG. 4A), or into an interior 144a (see FIG. 5A) of the tubular fitting 132, such as a closed tubular fitting 132b (see FIG. 5A), of the load limiter assembly 14, such as a second load limiter assembly (see FIG. 5A). Further, when the linear damper assembly 12 reaches the maximum compression 146, an excess kinetic energy 42a (see FIG. 1), or remaining energy, causes the linear damper assembly 12, for example, the piston assembly 74 (see FIG. 2A) and the cylinder assembly 76 (see FIG. 2A), of the linear damper assembly 12, to translate, or move, into the load limiter assembly 14, and the at least one deformable element 130, such as the two deformable elements 130a, 130b, absorb the excess kinetic energy 42a and deform.

In one version, the two deformable elements 130a, 130b absorb the excess kinetic energy 42a and irreversibly deform. When the linear damper assembly 12 translates, or moves, into the load limiter assembly 14, the pin 168, such as the shear pin 168a, tears, or wedges, through the deformable element 130a in an upward direction 190 (see FIG. 4B).

Now referring to FIG. 4C, FIG. 4C is an illustration of a left side view of the load limiter assembly 14, such as the first load limiter assembly 14a, of FIG. 4A, where a deformed element 131, such as a deformed element 131a, for example, in the form of a deformed machined feature 148a, is in a deformed position 186b. FIG. 4C further shows the head end 170a of the pin 168, such as the shear pin 168a, and shows the pin 168, such as the shear pin 168a, in an end position 188b. The kinetic energy 42 of the linear damper assembly 12 is transformed into a deformation energy 192 (see FIG. 1), such as heat, as the pin 168 tears, or wedges, itself in the upward direction 190 (see FIG. 4B) through the deformable element 130a (see FIG. 4B), to form and obtain the deformed element 131a (see FIG. 4C). The deformable elements 130a, 130b, such as in the form of machined features 148, in the tubular fitting 132, guide the pin 168, such as the shear pin 168a, vertically as it tears through the deformable elements 130a, 130b. to form and obtain the deformed elements 131a, 131b (see FIG. 1). The pin 168, such as the shear pin 168a, follows the direction of least resistance, such as where the material wall thickness is thinnest, for example, the thickness 154 (see FIG. 4A) of the deformable elements 130a, 130b (see FIG. 4A). The thickness 154 of the deformable elements 130a, 130b of the tubular body 140 of the tubular fitting 132, determines a shear-through force 194 (see FIG. 1) of the pin 168, such as the shear pin 168a. The length 150 (see FIG. 4B) of the at least one deformable element 130, such as each deformable element 130a, 130b, in the form of the machined feature 148, defines a maximum stroke 196 (see FIG. 4B). FIG. 4C shows a piston and cylinder stroke 198 of the linear damper assembly 12 (see FIG. 1) that has moved the second compression distance 189. It is preferable to have the length 150 of each of the deformable elements 130a, 130b, be sufficiently long so as to maximize the amount of energy absorbed by the deformable elements 130a, 130b, and to provide a longest possible deformation length. The length 150 and geometry of each of the deformable elements 130a, 130b, is determined and balanced against a desired weight of the energy absorbing landing gear system 10. By measuring a distance of the additional stroke of the piston and cylinder stroke 198, it is possible to determine the excess kinetic energy 42a (see FIG. 1), or additional energy, absorbed by the load limiter assembly 14 and the energy absorbing landing gear system 10.

As shown in FIG. 4C, the pin 168, such as the shear pin 168a, has torn through the deformable element 130a (see FIG. 4B) of the tubular fitting 132, to form a torn slot portion 200, which results in obtaining the deformed element 131, such as the two deformed elements 131a, 131b (see FIGS. 1, 4C) having a deformation 201 (see FIG. 1). In one version, the two deformed elements 131a, 131b irreversibly deform and have an irreversible deformation 202 (see FIGS. 1, 4C), or permanent deformation. The at least one deformable element 130, for example, the two deformable elements 130a, 130b, each function as a load fuse and a secondary energy absorber, to result in the at least one deformed element 131, for example, the two deformed elements 131a, 131b. Further, the deformable elements 130a, 130b (see FIGS. 4A-4B) in the undeformed position 186a (see FIG. 4B) may function, or serve, as mechanical sacrificial parts that may irreversibly or permanently deform to obtain the deformed elements 131a, 131b (see FIGS. 1, 4C) in the deformed position 186b (see FIG. 4C), when the linear damper assembly 12 reaches the maximum compression 146, and the excess kinetic energy 42a, or remaining energy, causes the linear damper assembly 12 to translate, or move, into the load limiter assembly 14 the second compression distance 189 (see FIG. 4C). In addition, exceeding a trigger load 204 (see FIG. 1) of the load limiter assembly 14 results in the deformation 201 (see FIG. 1), or the irreversible deformation 202 (see FIG. 1) such as permanent deformation, of the at least one deformable element 130 (see FIG. 4B), such as the two deformable elements 130a, 130b, for example, the machined features 148, on the tubular fitting 132, such as the open tubular fitting 132a, to obtain the at least one deformed element 131 (see FIG. 4C), such as the two deformed elements 131a, 131b. Further, the at least one deformed element 131, such as the two deformed elements 131a, 131b, of the load limiter assembly 14, such as the first load limiter assembly 14a, may serve, or function, as a mechanical shock absorber 206 (see FIG. 1) based on an irreversible deformation energy 192a (see FIG. 1).

In addition, the at least one deformed element 131, such as deformed elements 131a, 131b, serve, or function, as a visual indicator 208 (see FIGS. 1, 4C) that a load threshold 44 (see FIG. 1) of the linear damper assembly 12 (see FIG. 1) was exceeded, and that the energy absorbing landing gear system 10 (see FIG. 1) is overloaded or has absorbed additional load, which is more than it was designed to handle, such as due to a hard-landing load condition 46 (see FIG. 1) during a hard landing of the vertical landing apparatus 20 (see FIG. 1), and is the visual indicator 208 that the vertical landing apparatus 20 experienced a hard landing. Further, the at least one deformed element 131, such as deformed elements 131a, 131b, serve, or function, as the visual indicator 208 (see FIGS. 1, 4C) that an amount 201a (see FIG. 1) of the deformation 201 (see FIG. 1), or an amount 202a (see FIG. 1) of the irreversible deformation 202 (see FIGS. 1, 4C), shows an extent 44a (see FIG. 1) to which the load threshold 44 (see FIG. 1) of the linear damper assembly 12 (see FIG. 1) and the energy absorbing landing gear system 10 (see FIG. 1) were exceeded. For example, an indicator or a reference line on the cylinder 92 of the linear damper 70, such as the oil-gas damper 70a, may be used to visually indicate or show whether the cylinder 92 has moved or not. Such indicator or reference line may comprise a marking, a sticker, or another suitable indicator. Further, the at least one deformed element 131, such as deformed elements 131a, 131b, serve, or function, as the visual indicator 208 (see FIGS. 1, 4C) that there was movement of the pin 168, such as the shear pin 168a (see FIGS. 4A-4C), which shows that the vertical landing apparatus 20 (see FIG. 1) made a hard landing. The load limiter assembly 14, such as the first load limiter assembly 14a, with the tubular fitting 132 having the at least one deformed element 131, such as the two deformed elements 131a, 131b, that are deformed, or irreversibly deformed, may be inspected and replaced or exchanged with a load limiter assembly 14, such as the first load limiter assembly 14a, with the tubular fitting 132 having the at least one deformable element 130, such as the two deformed elements 130a, 130b, that are not damaged or irreversibly deformed.

Now referring to FIGS. 5A-5D, FIGS. 5A-5D show in further detail the load limiter assembly 14, such as in the form of the second load limiter assembly 14b. In particular, FIG. 5A is an illustration of a front perspective view of another version of the load limiter assembly 14, such as in the form of second load limiter assembly 14b, used in the energy absorbing landing gear system 10 of the disclosure, where the load limiter assembly 14, such as in the form of second load limiter assembly 14b, comprises a tubular fitting 132, such as a closed tubular fitting 132b, and at least one deformable element 130.

As shown in FIGS. 5A-5C and FIG. 3A, the load limiter assembly 14, such as in the form of the second load limiter assembly 14b, comprises the tubular fitting 132, such as in the form of the closed tubular fitting 132b, having a closed top 135. As further shown in FIGS. 5A-5B, the tubular fitting 132, such as the closed tubular fitting 132b, has a first end 136a, a second end 138a, a tubular body 140a formed between the first end 136a and the second end 138a, an exterior 142a, and an interior 144a. The interior 144a (see FIGS. 5A-5B) of the tubular body 140a of the tubular fitting 132, such as the closed tubular fitting 132b, is open or hollow, and is configured to receive and house, and receives and houses, at least one deformable element 130 (see FIGS. 5A-5B). When the load limiter assembly 14 is coupled, or attached, to the linear damper assembly 12, the interior 144a of the tubular body 140a of the tubular fitting 132 (see FIGS. 5A-5C) is configured to receive and house, and receives and houses, the cap element 78 (see FIGS. 5A-5C) of the linear damper assembly 12 (see FIGS. 5A-5C). When the linear damper assembly 12 reaches the maximum compression 146 (see FIG. 1), and the excess kinetic energy 42a (see FIG. 1) causes the linear damper assembly 12 to translate, or move, such as translate, or move, upwardly, into the load limiter assembly 14, during the landing phase 32 of the vertical landing apparatus 20, the interior 144a of the tubular body 140a of the tubular fitting 132, such as the closed tubular fitting 132b, is further configured to receive, and receives, at least the second end 94b (see FIG. 5C) of the cylinder 92 (see FIG. 5C) of the linear damper assembly 12 (see FIG. 5C).

As shown in FIGS. 5A-5B, the at least one deformable element 130 comprises one deformable element 130 disposed, or housed, in the interior 144a of the tubular body 140a of the tubular fitting 132, such as the closed tubular fitting 132b, and the deformable element 130 is mounted atop the linear damper assembly 12, and in particular, is mounted atop the cap element 78, which is mounted atop the cylinder 92 of the linear damper 70 of the linear damper assembly 12. As further shown in FIGS. 5A-5B, the deformable element 130 comprises in an exemplary version, a deformable crush element 210. The deformable crush element 210 (see FIGS. 1, 5A-5B) preferably comprises a metal honeycomb crush element 210a (see FIG. 1), for example, an aluminum honeycomb crush element 210b (see FIGS. 1, 5A-5B), or another suitable deformable crush element. Metal honeycomb crush elements 210a, such as aluminum honeycomb crush elements 210b, are particularly suitable because they have a very low mass density, e.g., 16-150 kg/m³ and may be compressed to 80% of their initial length. Alternatively, two or more deformable elements 130, such as two or more deformable crush elements 210, may be stacked on each other, or otherwise coupled together, and disposed, or housed in the interior 144a of the tubular body 140a of the tubular fitting 132, such as the closed tubular fitting 132b.

The deformable element 130, such as the deformable crush element 210, for example, the metal honeycomb crush element 210a, preferably in the form of the aluminum honeycomb crush element 210b, is made of a deformable element material 162 (see FIG. 1) having a strength 164 (see FIG. 1) and a load capacity 166 (see FIG. 1). Preferably, the deformable element material 162 (see FIG. 1) comprises a metal honeycomb material 162b (see FIG. 1), such as an aluminum honeycomb material, or another suitable metal honeycomb material. Preferably, the length of each of the deformable element 130 is sufficiently long so as to maximize the amount of energy absorbed by the deformable element 130, and to provide a longest possible deformation or crush length. The length and geometry of the deformable element is determined and balanced against a desired weight of the energy absorbing landing gear system 10.

As further shown in FIGS. 5A-5B, the deformable element 130, such as the deformable crush element 210, for example, the aluminum honeycomb crush element 210b, comprises a first end 212a, a second end 212b, and a body 214 disposed between the first end 212a and the second end 212b. The first end 212a of the deformable crush element 210 preferably interfaces with the flat surface interface 118 (see FIGS. 5A-5B) of the cap element 78 (see FIGS. 5A-5B), and the second end 212b preferably interfaces with the interior of the closed top 135 (see FIGS. 5A-5C).

Now referring to FIG. 5B, FIG. 5B is an illustration of a side cross-sectional view of the tubular fitting 132, such as the closed tubular fitting 132b, and the deformable element 130, such as the deformable crush element 210, of the load limiter assembly 14, such as the second load limiter assembly 14b, of FIG. 5A, where the deformable element 130 is in an undeformed position 222a. FIG. 5B shows the deformable element 130, such as the deformable crush element 210, for example, the aluminum honeycomb crush element 210b, in the undeformed position 222a. During the landing phase 32 of the vertical landing apparatus 20, the linear damper assembly 12 absorbs kinetic energy 42 (see FIG. 1) from the vertical landing motion 34 of the vertical landing apparatus 20, and when the linear damper assembly 12 reaches the maximum compression 146 (see FIG. 1), for example, when the piston assembly 74 (see FIG. 3A), including the piston rod 82 (see FIG. 3A) and the piston 88 (see FIG. 3A), of the linear damper assembly 12 (see FIG. 3A), are fully compressed, the linear damper assembly 12 moves the second compression distance 189 (see FIG. 5C) upwardly into the load limiter assembly 14, and the deformable element 130, such as the deformable crush element 210, for example, the aluminum honeycomb crush element 210b, compresses and deforms. Further, when the linear damper assembly 12 reaches the maximum compression 146, the excess kinetic energy 42a (see FIG. 1), or remaining energy, causes the linear damper assembly 12, for example, the piston assembly 74 and the cylinder assembly 76 (see FIG. 3A), of the linear damper assembly 12, to translate, or move, into the load limiter assembly 14, for example, into the interior 144a (see FIG. 5A) of the tubular fitting 132, such as the closed tubular fitting 132b (see FIG. 5A), of the load limiter assembly 14, such as the second load limiter assembly (see FIG. 5A), and the deformable element 130, such as the deformable crush element 210, for example, the aluminum honeycomb crush element 210b, absorbs the excess kinetic energy 42a, compresses and deforms. In one version, the deformable crush element 210, for example, the aluminum honeycomb crush element 210b, absorbs the excess kinetic energy 42a, compresses and irreversibly deforms.

Now referring to FIG. 5C, FIG. 5C is an illustration of a side cross-sectional view of the tubular fitting 132, such as the closed tubular fitting 132b, of FIG. 5B, and a deformed element 131, such as a deformed crush element 211, in a deformed position 222b. FIG. 5C further shows the piston and cylinder stroke 198 of the linear damper assembly 12 that has moved the second compression distance 189. The linear damper assembly 12 translates, or moves, to compress and deform, or irreversibly deform, the deformable element 130 (see FIG. 5B), such as the deformable crush element 210 (see FIG. 5B), to obtain the deformed element 131 (see FIG. 5C), such as the deformed crush element 211 (see FIG. 5C), for example, a deformed aluminum honeycomb crush element 211a (see FIG. 5C). The kinetic energy 42 of the linear damper assembly 12 is transformed into a deformation energy 192 (see FIG. 1), such as heat, as the deformable element 130, such as the deformable crush element 210, for example, the aluminum honeycomb crush element 210b, is deformed, or is permanently compressed and irreversibly deformed, to form the deformed element 131 (see FIG. 5C), such as the deformed crush element 211 (see FIG. 5C), for example, the deformed aluminum honeycomb crush element 211a (see FIG. 5C). The deformable crush element 210 is designed to absorb extra energy, but when the deformable crush element 210, for example, the aluminum honeycomb crush element 210b, is irreversibly deformed, the maximum load may not be determined or known.

The at least one deformable element 130, such as the deformable crush element 210, for example, the aluminum honeycomb crush element 210b, functions as a load fuse and a secondary energy absorber, to result in the at least one deformed element 131, such as the deformed crush element 211, for example, the deformed aluminum honeycomb crush element 211a. Further, the deformable element 130 (see FIGS. 5A-5B), such as the deformable crush element 210, in the undeformed position 222a (see FIG. 5B) functions as a mechanical sacrificial part that may deform, or irreversibly or permanently deform, to the deformed element 131 (see FIG. 5C) in the deformed position 222b (see FIG. 5C), when the linear damper assembly 12 (see FIG. 5C) reaches the maximum compression 146 (see FIG. 1), and the excess kinetic energy 42a (see FIG. 1), or remaining energy, causes the linear damper assembly 12 to translate, or move, into the load limiter assembly 14, such as upward into the load limiter assembly 14. In addition, exceeding the trigger load 204 (see FIG. 1) of the load limiter assembly 14 results in the deformation 201 (see FIG. 1), or the irreversible deformation 202 (see FIG. 5C) or permanent deformation, of the at least one deformable element 130, such as the deformable crush element 210, within the tubular fitting 132, such as the closed tubular fitting 132b.

In addition, the at least one deformed element 131 (see FIG. 5C), such as the deformed crush element 211 (see FIG. 5C), for example, the deformed aluminum honeycomb crush element 211a (see FIG. 5C), serves, or functions, as a visual indicator 208 (see FIGS. 1, 5C) that the load threshold 44 (see FIG. 1) of the linear damper assembly 12 (see FIGS. 1, 5C) was exceeded, and that the energy absorbing landing gear system 10 (see FIGS. 1, 5A) is overloaded or has absorbed additional load, which is more than it was designed to handle, such as due to a hard-landing load condition 46 (see FIG. 1) during a hard landing of the vertical landing apparatus 20, and is the visual indicator 208 that the vertical landing apparatus 20 experienced the hard landing. Further, the at least one deformed element 131, such as the deformed crush element 211 (see FIG. 5C), for example, the deformed aluminum honeycomb crush element 211a (see FIG. 5C), serves, or functions, as the visual indicator 208 (see FIGS. 1, 5C) that the amount 201a (see FIG. 1) of the deformation 201 (see FIG. 1), or the amount 202a (see FIG. 1) of the irreversible deformation 202 (see FIG. 1), shows the extent 44a (see FIG. 1) to which the load threshold 44 (see FIG. 1) of the linear damper assembly 12 (see FIG. 1) and the energy absorbing landing gear system 10 (see FIGS. 1, 5A) were exceeded. For example, an indicator or a reference line on the cylinder 92 of the linear damper 70, such as the oil-gas damper 70a, may be used to visually indicate or show whether the cylinder 92 has moved or not. Such indicator or reference line may comprise a marking, a sticker, or another suitable indicator. The load limiter assembly 14, such as the second load limiter assembly 14b, with the tubular fitting 132, such as the closed tubular fitting 132b, having the at least one deformed element 131 (see FIG. 5C), such as the deformed crush element 211 (see FIG. 5C), for example, the deformed aluminum honeycomb crush element 211a (see FIG. 5C), that is deformed, or irreversibly deformed, may be inspected and replaced, or exchanged, with another new, usable, and/or undamaged deformable element 130, such as the deformable crush element 210, for example, the metal honeycomb crush element 210a, the aluminum honeycomb crush element 210b, or another suitable deformable crush element. The deformed crush element 211 cannot be reset and may be replaced with a new undamaged deformable element 130.

FIGS. 5A-5C further show the cap element 78 comprising the first end 110a, the second end 110b, and the body 112, with the first end 110a attached to, or mounted on, the second end 94b of the cylinder 92, and the second end 110b comprising the flat surface interface 118. FIGS. 5A-5C further show the attachment member 52, such as in the form of the structural attachment fitting 54, for example, the first structural attachment fitting 54a, used with one or more sliding bearings 64. As shown in FIGS. 5B-5C, the one or more sliding bearings 64 are positioned in the space 66 between, and in contact with, one or more interior portions 68 of the attachment members 52, such as the structural attachment fitting 54, and in contact with the one or more exterior portions 60 of the cylinder 92 of the linear damper 70 of the linear damper assembly 12 of the one or more energy absorbing landing gear systems 10. As further shown in FIGS. 5B, 5C, the exterior 96a of the cylinder 92 of the linear damper assembly 12 is configured to translate or move, and translates or moves, over one or more surfaces 65 of the sliding bearing 64.

Now referring to FIG. 5D, FIG. 5D is a top cross-sectional view of a cross-section area 220, such as an exemplary cross-section area 220a, of the deformable element 130, such as the deformable crush element 210, of FIG. 5A. The body 214 (see FIG. 5A) of the deformable element 130, such as the deformable crush element 210, for example, the aluminum honeycomb crush element 210b (see FIG. 5A), is preferably a substantially cylindrical shape that may be cut or modified to have the exemplary cross-section area 220a. The type and density of the deformable element material 162, such as the metal honeycomb material 162b, for example, aluminum honeycomb material, as well as the cross-section area 220, are selected such that a desired crushing force is obtained. One way of tuning the cross-section area 220, such as the exemplary cross-section area 220a (see FIG. 5D), is to cut or modify one or more flat sides 216 (see FIGS. 5A, 5D), such as a first flat side 216a (see FIGS. 5A, 5D) and a second flat side 216b (see FIG. 5D) to be symmetric to each, and leaving one or more curved sides 218 (see FIGS. 5A, 5D), such as a first curved side 218a (see FIGS. 5A, 5D) and a second curved side 218b (see FIG. 5D) symmetric to each other, and positioned between the flat sides 216. As shown in FIG. 5D, the cross-section area 220, such as the exemplary cross-section area 220a, comprises four sides, including two flat sides 216 and two curved sides 218, where each flat side 216 alternates with each curved side 218. The cross-section area 220, such as the exemplary cross-section area 220a, shown in FIG. 5D, is one type of shape, and the deformable element 130, such as the deformable crush element 210, may have another suitable cross-section area or shape.

Now referring to FIG. 6A, FIG. 6A is an illustration of a side view of the energy absorbing landing gear system 10, such as in the form of energy absorbing landing gear system 10a, of the disclosure, in an unassembled arrangement 223, with the load limiter assembly 14, such as in the form of the first load limiter assembly 14a, separated from the linear damper assembly 12. With regard to energy absorption, in this exemplary version shown in FIG. 6A, the linear damper assembly 12 is designated as energy absorption structure A 224, and is configured to function, and functions, as a hydraulic shock absorber 70c, and the load limiter assembly 14 is designated as energy absorption structure B 226, and is configured to function, and functions, as a mechanical shock absorber 206. With a coupling and integrating action 228 (see FIG. 6A), the load limiter assembly 14 is configured for coupling, and couples, to the linear damper assembly 12, and the load limiter assembly 14 is configured to integrate, and integrates, into the attachment member 52 comprising the structural attachment fitting 54, such as in the form of the first structural attachment fitting 54a, which is attached around the second end 94b (see FIGS. 2B, 4A) of the cylinder 92.

As shown in FIG. 6A, and discussed above with respect to FIG. 2A, the energy absorbing landing gear system 10, such as in the form of energy absorbing landing gear system 10a, comprises the linear damper assembly 12 with the linear damper 70 coupled, or attached, to the base member 72, such as in the form of landing pad 72a, where the linear damper 70 comprises the piston assembly 74, the cylinder assembly 76, and the cap element 78. FIG. 6A shows the piston rod 82 of the piston assembly 74, the cylinder 92 of the cylinder assembly 76, and the first end 110a, the second end 110b, the body 112, the curved portion 114, and the through opening 116, of the cap element 78. FIG. 6A further shows the attachment member 52 comprising the structural attachment fitting 54, such as in the form of the second structural attachment fitting 54b, which is attached around a portion of the cylinder 92 near the first end 94a (see FIG. 2B) of the cylinder 92.

Figure 6B:
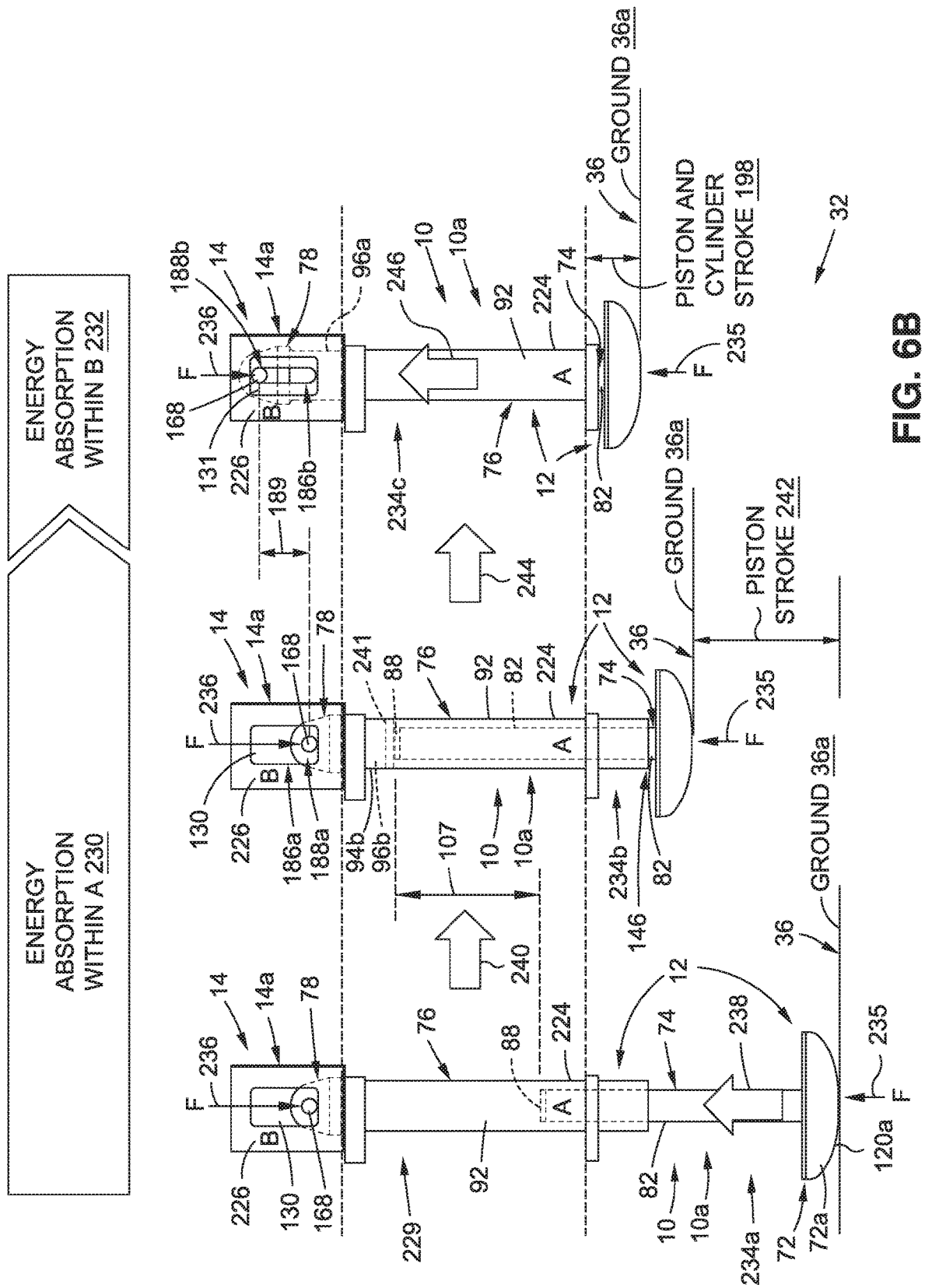
FIG. 6B is an illustration of the energy absorbing landing gear system of FIG. 6A, in an assembled arrangement, with the load limiter assembly attached to the linear damper assembly, and showing the energy absorbing landing gear system in various exemplary positions during a landing phase.

Now referring to FIG. 6B, FIG. 6B is an illustration of the energy absorbing landing gear system 10, such as in the form of energy absorbing landing gear system 10a, of FIG. 6A, in an assembled arrangement 229, with the load limiter assembly 14, such as the first load limiter assembly 14a, attached to the linear damper assembly 12, and showing the energy absorbing landing gear system 10 in various exemplary positions during the landing phase 32. FIG. 6B further shows an energy absorption within A stage 230 of the energy absorption structure A 224 and an energy absorption within B stage 232 of the energy absorption structure B 226.

As shown in FIG. 6B, in a first position 234a, upon landing during the landing phase 32, the piston assembly 74 of the energy absorbing landing gear system 10, such as in the form of energy absorbing landing gear system 10a, is fully extended, with the piston rod 82 fully extending downwardly from the cylinder 92 of the cylinder assembly 76, and an impact force 235 is applied upward, and an opposing normal force 236 is applied downward, to cause the piston assembly 74, including the piston rod 82 and the piston 88, to translate, or move, upwardly in a translation direction 238 into the cylinder 92 of the cylinder assembly 76. The linear damper assembly 12 comprising the energy absorption structure A 224 (see FIG. 6B) absorbs kinetic energy 42 (see FIG. 1) during the landing phase 32, such as from a vertical landing motion 34 (see FIG. 1) of the vertical landing apparatus 20 (see FIGS. 1, 8) with the attached one or more energy absorbing landing gear systems 10.

FIG. 6B further shows, in the first position 234a, the piston rod 82 attached to the base member 72, such as the landing pad 72a, and the bottom end 120a of the base member 72 in contact with the landing surface 36, such as the ground 36a, and shows the load limiter assembly, such as the first load limiter assembly 14a, with the deformable element 130 and the pin 168 coupled to the deformable element 130 and the cap element 78.

As further shown in FIG. 6B, in a progression 240 from the first position 234a to a second position 234b, the piston assembly 74, including the piston rod 82 and the piston 88, translates, or moves, and compresses the first compression distance 107 into the cylinder 92 of the cylinder assembly 76. As shown in FIG. 6B, in the second position 234b during the landing phase 32, the piston assembly 74, including the piston rod 82 and the piston 88, of the linear damper assembly 12 is fully translated and compressed into the cylinder 92 of the cylinder assembly 76, until the piston assembly 74, including the piston 88, contacts an internal stop element 241 (see FIG. 6B), such as located in the interior 96b near the second end 94b of the cylinder 92, and the linear damper assembly 12, including the piston assembly 74, reaches the maximum compression 146. FIG. 6B further shows the impact force 235, the opposing normal force 236, and a piston stroke 242 in the second position 234b. The piston stroke 242 corresponds to the first compression distance 107 that the piston assembly 74, including the piston rod 82 and the piston 88 (see FIG. 2A), of the linear damper assembly 12 translates, or moves, and compresses upwardly into and in the interior 96b of the cylinder 92 of the cylinder assembly 76, of the energy absorbing landing gear system 10, such as in the form of energy absorbing landing gear system 10a, and toward the load limiter assembly 14.

FIG. 6B further shows, in the second position 234b, the piston rod 82 attached to the base member 72, such as the landing pad 72a, and the bottom end 120a of the base member 72 in contact with the landing surface 36, such as the ground 36a, and shows the load limiter assembly, such as the first load limiter assembly 14a, with the deformable element 130 in the undeformed position 186a, and the pin 168 coupled to the cap element 78 and the pin 168 in the start position 188a.

As further shown in FIG. 6B, in a progression 244 from the second position 234b to a third position 234c, when the linear damper assembly 12 reaches the maximum compression 146, for example, when the piston assembly 74, including the piston rod 82 and the piston 88, of the linear damper assembly 12, are fully compressed, the linear damper assembly 12 moves the second compression distance 189 upwardly into the load limiter assembly 14, and the at least one deformable element 130, deforms. Further, when the linear damper assembly 12 reaches the maximum compression 146, an excess kinetic energy 42a (see FIG. 1) causes the linear damper assembly 12, including the piston assembly 74 and the cylinder assembly 76, to translate, or move, and compress upwardly into the load limiter assembly 14, such as the first load limiter assembly 14a, in a translation direction 246, and the deformable element 130 absorbs the excess kinetic energy 42a and deforms to obtain the deformed element 131. In one version, the deformable element 130 absorbs the excess kinetic energy 42a and irreversibly deforms. In particular, the exterior 96a of the cylinder 92, slides and translates over the sliding bearings 64 (see FIGS. 4A, 5A-5C), such as the low friction sliding bearings, positioned between the exterior 96a of the cylinder 92 and interior portions 68 (see FIG. 5C) of each of the attachment members 52 (see FIG. 6A), such as the structural attachment fittings 54 (see FIG. 6A).

As shown in FIG. 6B, in the third position 234c, the pin 168 is in the end position 188b and is coupled to the cap element 78. The pin 168 has moved or torn through the deformable element 130 of the second position 234b, to form or obtain the deformed element 131 in the deformed position 186b shown in the third position 234c. The load limiter assembly 14 comprising the energy absorption structure B 226 (see FIG. 6B) thus absorbs the excess kinetic energy 42a (see FIG. 1) from the translation of both the piston assembly 74 and the cylinder assembly 76 of the linear damper assembly 12, into the load limiter assembly 14, to deform, or irreversibly deform, the deformable element 130 to result in and obtain the deformed element 131. The load limiter assembly 14 provides a linear force as it deforms and then reaches a limit at which it yields at a constant force.

The third position 234c of FIG. 6B further shows the impact force 235, the opposing normal force 236, and a piston and cylinder stroke 198, which corresponds to the second compression distance 189 that the piston assembly 74 and the cylinder assembly 76 of the linear damper assembly 12, translate, or move, and compress upwardly into the load limiter assembly 14, such as the first load limiter assembly 14a. The third position 234c of FIG. 6B further shows the piston rod 82 attached to the base member 72, such as the landing pad 72a, in contact with the landing surface 36, such as the ground 36a.

Now referring to FIG. 7, FIG. 7 is a front perspective view of a version of the energy absorbing landing gear system 10, such as in the form of energy absorbing landing gear system 10a, of the disclosure, where the energy absorbing landing gear system 10 is attached to, and installed in, a vertical landing apparatus 20, such as an aircraft 20a. As shown in FIG. 7, the energy absorbing landing gear system 10 is attached to the structural frame 24, such as the airframe 24a, of the vertical landing apparatus 20, via attachment members 52 comprising structural attachment fittings 54, such as in the form of first structural attachment fitting 54a and second structural attachment fitting 54b, each having the planar surface portion 56 with four sides 62 depending from the planar surface portion 56. Each attachment member 52 may be attached to the structural frame 24 of the vertical landing apparatus 20 with a means of attachment, such as by fastening with one or more fastening elements, for example, bolts, rivets, screws, or other suitable fastening elements, or by welding, or by adhesive bonding, or by another suitable means of attachment.

FIG. 7 shows an exemplary version of how the energy absorbing landing gear system 10 is attached to the vertical landing apparatus 20 with the structural attachment fittings 54. However, the energy absorbing landing gear system 10 may be attached to the vertical landing apparatus 20 with other means of attachment other than the attachment members 52, such as the structural attachment fittings 54. For example, the energy absorbing landing gear system 10 may be attached to the vertical landing apparatus 20 directly with one or more fastening elements, by welding, by adhesive bonding, or by another suitable means of attachment, or the energy absorbing landing gear system 10 may be attached to the vertical landing apparatus 20 via another type of structural attachment apparatus or device.

As further shown in FIG. 7, the energy absorbing landing gear system 10, such as in the form of energy absorbing landing gear system 10a, comprises the linear damper assembly 12 attached to the load limiter assembly 14, such as in the form of first load limiter assembly 14a, as discussed above with regard to FIG. 4A. As further shown in FIG. 7, the linear damper assembly 12 comprises the piston assembly 74 with the piston rod 82 attached between the base member 72, such as in the form of landing pad 72a, and the cylinder assembly 76 having the cylinder 92. The cap element 78 is coupled atop the cylinder 92 and is coupled to the tubular fitting 132, such as the open tubular fitting 132a, via the pin 168, which pin 168 is inserted through the deformable elements 130 and through the cap element 78.

Now referring to FIG. 8, FIG. 8 is a front perspective view of an exemplary version of a vertical landing apparatus 20, such as an aircraft 20a, having four energy absorbing landing gear systems 10, as disclosed herein, attached to the vertical landing apparatus 20. As shown in FIG. 8, as well as discussed above with respect to FIG. 1, in another version of the disclosure, there is provided a vertical landing apparatus 20 comprising one or more energy absorbing landing gear systems 10. The vertical landing apparatus 20 comprises the structural frame 24 (see FIGS. 1, 8), such as the airframe 24a (see FIGS. 1, 8). As shown in FIG. 8, the structural frame 24, such as the airframe 24a, includes attachment portions 26, such as in the form of booms 28.

As shown in FIG. 8, in one exemplary version, four energy absorbing landing gear systems 10 are attached to the vertical landing apparatus 20. As further shown in FIG. 8, each of the energy absorbing landing gear systems 10 is attached to the attachment portions 26, such as the booms 28, where two energy absorbing landing gear systems 10 are attached to one boom 28 and two energy absorbing landing gear systems 10 are attached to another boom 28. The four energy absorbing landing gear systems 10 are attached to the vertical landing apparatus 20 so that they are in vertical alignment 22 (see FIG. 8) with each other. FIG. 8 shows an exemplary version of the vertical landing apparatus 20 and how multiple energy absorbing landing gear systems 10 are attached to the vertical landing apparatus 20. However, as discussed above, one or more of the energy absorbing landing gear systems 10 may be attached to, or installed in, other types of vertical landing apparatuses. The vertical landing apparatus 20 may comprise one of, the aircraft 20a (see FIGS. 1, 8), a vertical take-off and landing (VTOL) aircraft 20b (see FIG. 1), a manned aircraft 20c (see FIG. 1), an unmanned aerial vehicle (UAV) 20d (see FIG. 1), a rotorcraft 20e (see FIG. 1), an airdrop container 20f (see FIG. 1) configured to land in the vertical landing motion 34 (see FIG. 1), or another suitable vertical landing apparatus.

As discussed above, each of the one or more energy absorbing landing gear systems 10 is attached to the structural frame 24, via one or more attachment members 52 (see FIGS. 1, 2A, 3A), such as one or more structural attachment fittings 54 (see FIGS. 2A, 3A), and one or more sliding bearings 64 (see FIGS. 1, 4A, 5A) are preferably disposed between each of the one or more structural attachment fittings 54 and the cylinder 92 of the linear damper assembly 12 of each of the one or more energy absorbing landing gear systems 10. As further discussed above, each of the one or more energy absorbing landing gear systems 10 comprises the load limiter assembly 14 (see FIG. 1) coupled to the linear damper assembly 12 (see FIG. 1). In one version, the load limiter assembly 14 is coupled in a series configuration 16 (see FIG. 1) to, and atop, the linear damper assembly 12. The linear damper assembly 12, as discussed above, in one version, comprises the linear damper 70 (see FIGS. 1, 2A, 3A) coupled to the base member 72 (see FIGS. 1, 2A, 3A), and the linear damper 70 comprises one of, an oil-gas damper 70a (see FIG. 1), a gas spring 70b (see FIG. 1), a hydraulic shock absorber 70c (see FIG. 1), an elastic damper 70d (see FIG. 1), or another suitable linear damper. The linear damper assembly 12 absorbs kinetic energy 42 (see FIG. 1) from the vertical landing motion 34 (see FIG. 1) of the vertical landing apparatus 20 during the landing phase 32 (see FIG. 1). The load limiter assembly 14 has at least one deformable element 130 (see FIGS. 1, 2A, 4A, 5A) to enhance the energy absorption capability 48 (see FIG. 1). In one version, as discussed above with regard to FIGS. 4A-4C, the load limiter assembly 14 comprises the tubular fitting 132, such as the open tubular fitting 132a, incorporating two deformable elements 130a, 130b aligned opposite each other on the tubular fitting 132. In another version, as discussed above with regard to FIGS. 5A-5C, the load limiter assembly 14 comprises the tubular fitting 132, such as the closed tubular fitting 132b, and the at least one deformable element 130 disposed in the interior 144a of the closed tubular fitting 132b and mounted atop the linear damper assembly 12 comprises the deformable crush element 210, such as the metal honeycomb crush element 210a (see FIG. 1), for example, the aluminum honeycomb crush element 210b.

Figure 9:
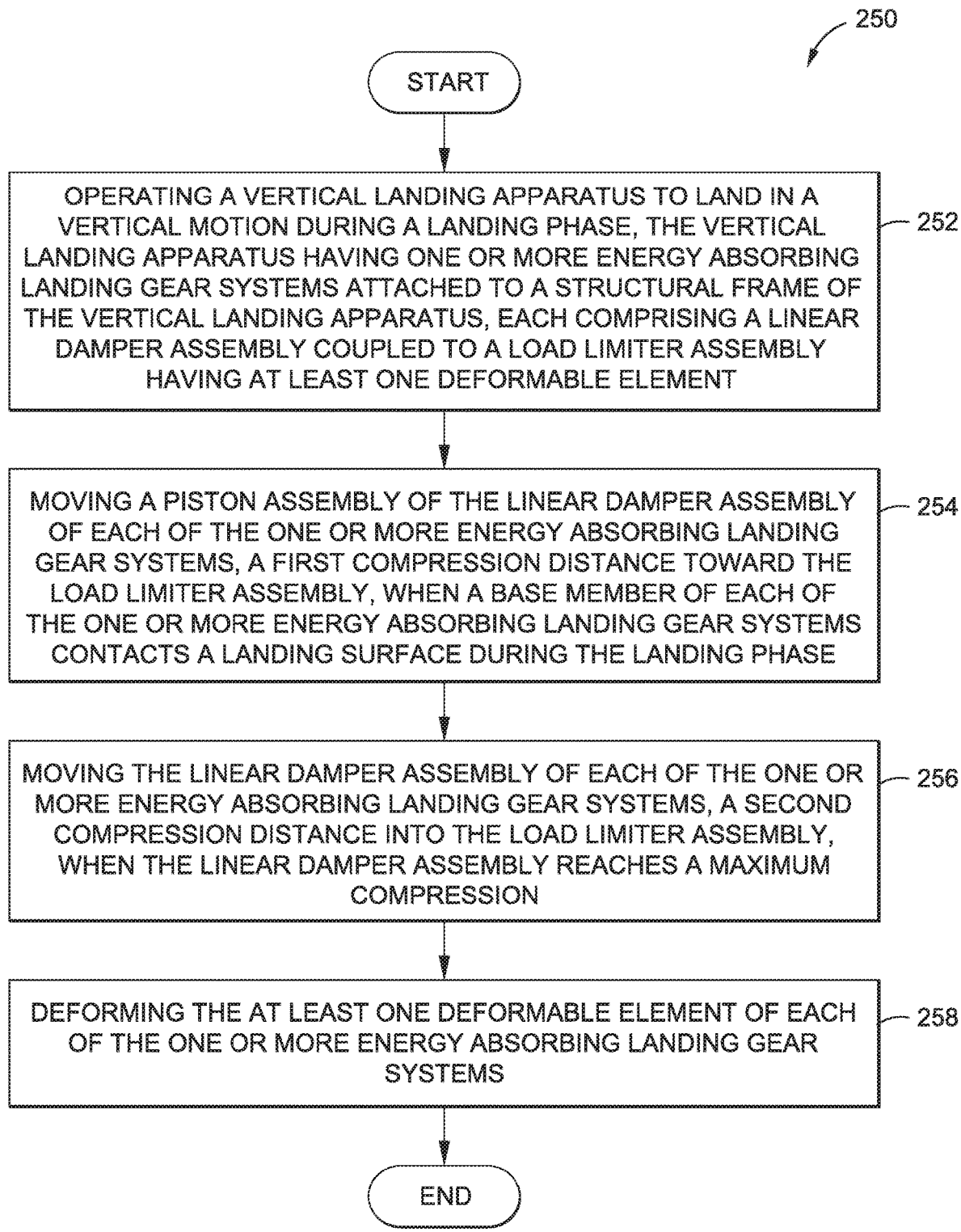
FIG. 9 is an illustration of a flow diagram showing an exemplary version of a method of the disclosure.

Now referring to FIG. 9, FIG. 9 is an illustration of a flow diagram showing an exemplary version of a method 250 of the disclosure. In another version of the disclosure, there is provided the method 250 (see FIG. 9) of using one or more energy absorbing landing gear systems 10 (see FIG. 1) attached to a vertical landing apparatus 20 (see FIG. 1) during a landing phase 32 (see FIG. 1) of the vertical landing apparatus 20.

The blocks in FIG. 9 represent operations and/or portions thereof, and lines connecting the various blocks do not imply any particular order or dependency of the operations or portions thereof. FIG. 9 and the disclosure of the steps of the method 250, set forth herein, should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 9, the method 250 comprises the step 252 of operating the vertical landing apparatus 20 to land in a vertical landing motion 34 (see FIG. 1) during the landing phase 32 of the vertical landing apparatus 20. The vertical landing apparatus 20 has the one or more energy absorbing landing gear systems 10 attached to the structural frame 24 (see FIGS. 1, 8), such as the airframe 24a (see FIGS. 1, 8), of the vertical landing apparatus 20. As shown in FIG. 8, in one version, the vertical landing apparatus 20 has four energy absorbing landing gear systems 10 attached to the structural frame 24 in a vertical alignment 22 with each other. However, the vertical landing apparatus 20 may have one, two, three, or more than four energy absorbing landing gear systems 10 attached to the vertical landing apparatus 20.

The step 252 of operating the vertical landing apparatus 20 further comprises, operating the vertical landing apparatus 20 comprising one of, an aircraft 20a (see FIG. 1), a vertical take-off and landing (VTOL) aircraft 20b (see FIG. 1), a manned aircraft 20c (see FIG. 1), an unmanned aerial vehicle (UAV) 20d (see FIG. 1), a rotorcraft 20e (see FIG. 1), or an airdrop container 20f (see FIG. 1) configured to land in the vertical landing motion 34 (see FIG. 1).

As discussed in detail above, each of the one or more energy absorbing landing gear systems 10 (see FIGS. 1, 2A, 3A) comprises the linear damper assembly 12 (see FIGS. 1, 2A, 3A) comprising the linear damper 70 (see FIGS. 1, 2A, 3A) having a piston assembly 74 (see FIGS. 2A, 3A), including a piston rod 82 (see FIGS. 2A, 3A) and a piston 88 (see FIGS. 2A, 3A), coupled to the base member 72 (see FIGS. 1, 2A, 3A). The base member 72 interfaces with a landing surface 36 (see FIG. 6B), such as ground 36a (see FIG. 6B). Each of the one or more energy absorbing landing gear systems 10, as discussed above, further comprises the load limiter assembly 14 coupled to the linear damper assembly 12. The load limiter assembly 14 has at least one deformable element 130 (see FIGS. 1, 2A, 4A, 5A). In one version, the load limiter assembly 14 is coupled in a series configuration 16 (see FIG. 1) to, and atop, the linear damper assembly 12.

The step 252 of operating the vertical landing apparatus 20 having one or more energy absorbing landing gear systems 10 further comprises, operating the vertical landing apparatus 20 having one or more energy absorbing landing gear systems 10, each comprising the load limiter assembly 14, such as in the form of the first load limiter assembly 14a (see FIG. 4A), further comprising, a tubular fitting 132 (see FIG. 4A), such as an open tubular fitting 132a (see FIG. 4A), incorporating the at least one deformable element 130 (see FIG. 4A), where the at least one deformable element 130 comprises two deformable elements 130a, 130b (see FIG. 4A) aligned opposite each other on the tubular fitting 132. Each of the two deformable elements 130a, 130b has a through opening 160 (see FIG. 4A). As discussed above with respect to FIG. 4A, the load limiter assembly 14, such as the first load limiter assembly 14a, further comprises the pin 168, such as the shear pin 168a, inserted through each through opening 160 of the two deformable elements 130a, 130b, and the pin 168 being further coupled to the linear damper assembly 12. When the linear damper assembly 12 translates, or moves, the second compression distance 189 (see FIGS. 4C, 6B) upwardly into the load limiter assembly 14, such as the first load limiter assembly 14a, the pin 168, such as the shear pin 168a, tears or moves through the two deformable elements 130a, 130b, to deform the two deformable elements 130a, 130b, and to obtain one or more deformed elements 131 (see FIG. 4C), such as deformed elements 131a, 131b (see FIG. 4C). In one version, the two deformable elements 130a, 130b absorb the excess kinetic energy 42a and irreversibly deform.

The step 252 of operating the vertical landing apparatus 20 having one or more energy absorbing landing gear systems 10 further comprises, operating the vertical landing apparatus 20 having one or more energy absorbing landing gear systems 10, each comprising the load limiter assembly 14, such as in the form of the second load limiter assembly 14b (see FIG. 5A), further comprising, the tubular fitting 132, such as the closed tubular fitting 132b (see FIG. 5A), and the at least one deformable element 130 is disposed in the interior 144a (see FIG. 5A) of the closed tubular fitting 132b and mounted atop the linear damper assembly 12. The at least one deformable element 130 (see FIG. 5A) preferably comprises the deformable crush element 210 (see FIG. 5A), such as a metal honeycomb crush element 210a (see FIG. 1), for example, an aluminum honeycomb crush element 210b (see FIGS. 1, 5A). When the linear damper assembly 12 translates, or moves, the second compression distance 189 (see FIG. 5C) upwardly into the load limiter assembly 14, such as the second load limiter assembly 14b, the aluminum honeycomb crush element 210b is compressed and deformed. In one version, the load limiter assembly 14, such as the second load limiter assembly 14b, is compressed and irreversibly deformed.

As shown in FIG. 9, the method 250 further comprises the step 254 of moving the piston assembly 74 of the linear damper assembly 12 of each of the one or more energy absorbing landing gear systems 10, a first compression distance 107 (see FIGS. 1, 6B) toward the load limiter assembly 14, when the base member 72 (see FIG. 6B) of each of the one or more energy absorbing landing gear systems 10 contacts a landing surface 36 (see FIG. 6B), such as the ground 36a (see FIG. 6B), during the landing phase 32 (see FIG. 6B). The linear damper assembly 12 absorbs kinetic energy 42 (see FIG. 1) from the vertical landing motion 34 (see FIG. 1).

As shown in FIG. 9, the method 250 further comprises the step 256 of moving the linear damper assembly 12, including the piston assembly 74 (see FIG. 6B) and the cylinder assembly 76 (see FIG. 6B), of each of the one or more energy absorbing landing gear systems 10, a second compression distance 189 (see FIGS. 1, 4C, 5C, 6B) upwardly into the load limiter assembly 14 (see FIG. 6B), when the linear damper assembly 12 (see FIG. 6B), including the piston assembly 74 (see FIG. 6B), reaches a maximum compression 146 (see FIGS. 1, 6B).

As shown in FIG. 9, the method 250 further comprises the step 258 of deforming the at least one deformable element 130 of each of the one or more energy absorbing landing gear systems 10. In one version, the at least one deformable element 130 of each of the one or more energy absorbing landing gear systems 10 absorbs excess kinetic energy 42a and irreversibly deforms. The at least one deformable element 130 of each of the one or more energy absorbing landing gear systems 10 enhances an energy absorption capability 48 during the landing phase 32.

The step 258 of deforming the at least one deformable element 130, further comprises, obtaining at least one deformed element 131 (see FIGS. 4C, 5C) that serves as a visual indicator 208 (see FIGS. 1, 4C, 5C) that a load threshold 44 (see FIG. 1) of the linear damper assembly 12 was exceeded and the vertical landing apparatus 20 experienced a hard-landing load condition 46 (see FIG. 1) in a hard landing.

EXAMPLE

In a numerical example, a known oil-gas damper was compared to the energy absorbing landing gear system of the disclosure with a load limiter assembly having a pin, such as a shear pin, coupled to a deformable element.

A known oil-gas damper was tested to reach a peak load or a maximum force of 2500 N (two thousand five hundred Newtons) in a hard-landing load condition. A stroke of the cylinder was limited to 200 mm (two hundred millimeters) (7.87 inches). The absorbed energy was calculated with a linear damper or strut efficiency number of 80% (eighty percent) and resulted in 400 Nm (four hundred Newton meters) of energy absorption capability.

For the energy absorbing landing gear system of the disclosure with the first load limiter assembly having the pin, such as the shear pin, coupled to the deformable element, adding the pin, such as the shear pin, triggered at a peak load or a maximum force of 2700 N (two thousand seven hundred Newtons) and allowed for a stroke of 40 mm (forty millimeters) (1.57 inches). The absorbed energy was calculated with a linear damper or strut efficiency number of close to 100% (one hundred percent). The addition of the load limiter assembly having the pin, such as the shear pin, provided an enhanced 108 Nm (one hundred eight Newton meters) energy absorption capability, and resulted in a linear damper or strut efficiency number increase of 27% (twenty-seven percent) energy absorption capability.

Thus, it was found that the efficiency of the energy absorbing landing gear system of the disclosure with the load limiter assembly having the pin, such as the shear pin, coupled to the deformable element was higher than the known oil-gas damper at the cost of the deformable element torn by the pin having a deformation, such as an irreversible deformation.

Figure 10:
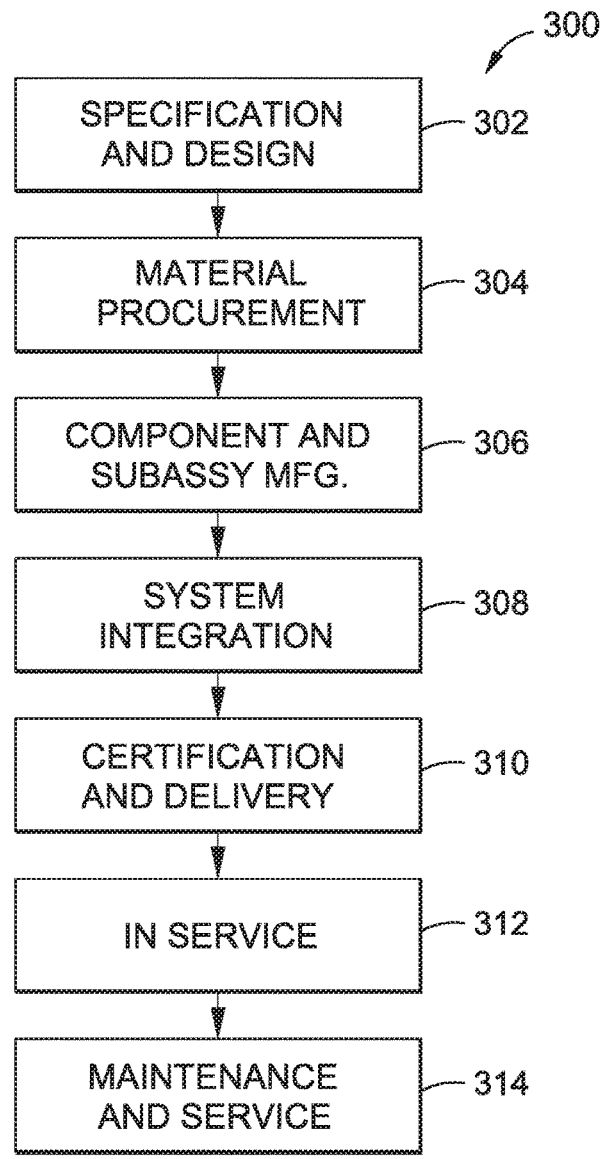
FIG. 10 is a flow diagram of a version of an aircraft manufacturing and service method.
Figure 11:
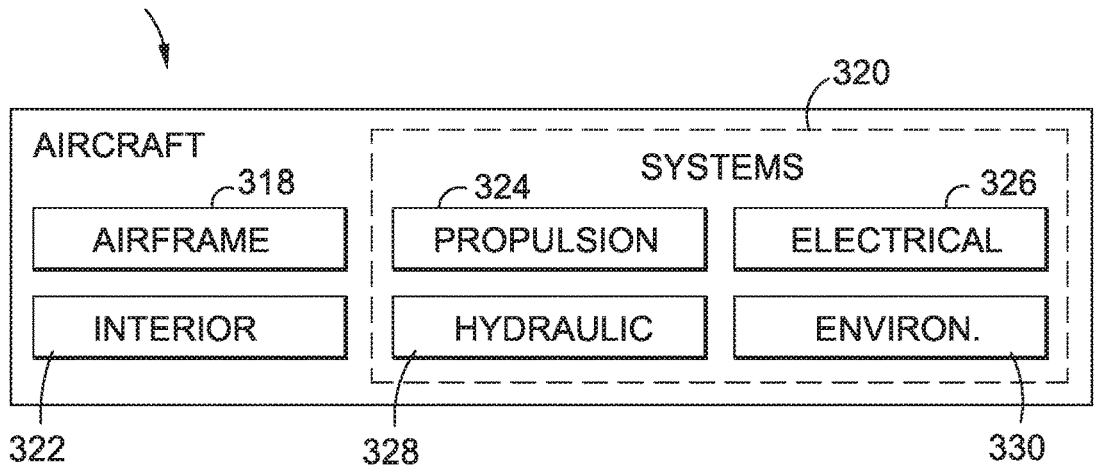
FIG. 11 is an illustration of a functional block diagram of a version of an aircraft.

Now referring to FIGS. 10 and 11, FIG. 10 is a flow diagram of an embodiment of an aircraft manufacturing and service method 300, and FIG. 11 is an illustration of a functional block diagram of an embodiment of an aircraft 316. Referring to FIGS. 10-11, versions of the disclosure may be described in the context of the aircraft manufacturing and service method 300, as shown in FIG. 10, and the aircraft 316, as shown in FIG. 11. During pre-production, the exemplary aircraft manufacturing and service method 300 (see FIG. 10) may include specification and design 302 (see FIG. 10) of the aircraft 316 (see FIG. 11) and material procurement 304 (see FIG. 10). During manufacturing, component and subassembly manufacturing 306 (see FIG. 10) and system integration 308 (see FIG. 10) of the aircraft 316 (see FIG. 11) takes place. Thereafter, the aircraft 316 (see FIG. 11) may go through certification and delivery 310 (see FIG. 10) in order to be placed in service 312 (see FIG. 10). While in service 312 (see FIG. 10) by a customer, the aircraft 316 (see FIG. 11) may be scheduled for routine maintenance and service 314 (see FIG. 10), which may also include modification, reconfiguration, refurbishment, and other suitable services.

Each of the processes of the aircraft manufacturing and service method 300 (see FIG. 10) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 11, the aircraft 316 produced by the exemplary aircraft manufacturing and service method 300 (see FIG. 10) may include an airframe 318 with a plurality of systems 320 and an interior 322. As further shown in FIG. 11, examples of the systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, including automotive vehicles, the marine industry, including watercraft, ships, and submarines, and other suitable industries.

Methods and systems embodied herein may be employed during any one or more of the stages of the aircraft manufacturing and service method 300 (see FIG. 10). For example, components or subassemblies corresponding to component and subassembly manufacturing 306 (see FIG. 10) may be fabricated or manufactured in a manner similar to components or subassemblies produced while the aircraft 316 (see FIG. 11) is in service 312 (see FIG. 10). Also, one or more method embodiments, system embodiments, or a combination thereof, may be utilized during component and subassembly manufacturing 306 (see FIG. 10) and system integration 308 (see FIG. 10), for example, by substantially expediting assembly of, or reducing the cost of, the aircraft 316 (see FIG. 11). Similarly, one or more of method versions, system versions, or a combination thereof, may be utilized while the aircraft 316 (see FIG. 11) is in service 312 (see FIG. 10), for example and without limitation, to maintenance and service 314 (see FIG. 10).

Disclosed versions of the energy absorbing landing gear system 10 (see FIGS. 1, 2A-2C, 3A-3B), and the method 250 (see FIG. 9) combine two energy absorption assemblies or systems, including a load limiter assembly 14 (see FIGS. 1, 2A, 3A), coupled to a linear damper assembly 12 (see FIGS. 1, 2A, 3A), such coupled in a series configuration 16 (see FIGS. 1, 2A, 3A), to the linear damper assembly 12, to absorb an excess kinetic energy 42a (see FIG. 1), and to enhance an energy absorption capability 48 (see FIG. 1) and a damping capability for the energy absorbing landing gear system 10 during a vertical landing motion 34 (see FIG. 1) of the vertical landing apparatus 20 (see FIG. 1) in a landing phase 32 (see FIG. 1). The energy absorption capability 48 decreases the risk of possible damage to the structural frame 24 (see FIGS. 1, 8), such as the airframe 24a (see FIGS. 1, 8), of the vertical landing apparatus 20 (see FIGS. 1, 8), during the landing phase 32 of the vertical landing apparatus 20. By measuring the distance of the additional piston and cylinder stroke 198 (see FIGS. 4C, 5C, 6B), the enhanced energy absorption taken into the load limiter assembly 14 of the energy absorbing landing gear system 10 can be determined. The additional piston and cylinder stroke 198 allows more energy to be absorbed.

In addition, disclosed versions of the energy absorbing landing gear system 10 (see FIGS. 1, 2A-2C, 3A-3B), and the method 250 (see FIG. 9) provide the load limiter assembly 14 (see FIGS. 1, 2A, 3A) which limits the load to a maximum level. The load limiter assembly 14 of the energy absorbing landing gear system 10 (see FIGS. 1, 2A-2C, 3A-3B), and the method 250 (see FIG. 9) prevent a load peak when the piston assembly 74 (see FIGS. 2A, 3A), including the piston rod 82 (see FIGS. 2A, 3A), is fully compressed at a maximum compression 146 (see FIGS. 1, 6B) and hits an internal stop within the cylinder 92 (see FIGS. 2A, 3A) of the cylinder assembly 76 (see FIGS. 2A, 3A). The load threshold 44 (see FIG. 1) and the trigger load 204 (see FIG. 1) may be tuned by selection of the material thickness, material type, and/or material density of the deformable element material 162 (see FIG. 1), such as aluminum for machined features 148 (see FIG. 4A), or aluminum honeycomb material for the aluminum honeycomb crush element 210b (see FIG. 5A), or other suitable deformable element materials. The load threshold 44 (see FIG. 1) and the trigger load 204 (see FIG. 1) may be further tuned by selection of the cross-section area 220 (see FIG. 5D) of the deformable element 130, such as the deformable crush element 210, for example, the aluminum honeycomb crush element 210b. The load threshold 44 (see FIG. 1) and the trigger load 204 (see FIG. 1) may be further tuned by selection of the diameter 176 (see FIG. 2C) of the cylindrical shaft 172 (see FIG. 2C) of the pin 168 (see FIG. 2C), such as the shear pin 168a (see FIG. 2C).

Moreover, the deformed element 131 (see FIGS. 1, 4C, 5C) of disclosed versions of the energy absorbing landing gear system 10 (see FIGS. 1, 2A-2C, 3A-3B) serves, or functions, as a visual indicator 208 (see FIGS. 1, 4C, 5C) that the load threshold 44 (see FIG. 1) of the linear damper assembly 12 (see FIG. 1) was exceeded, and that the energy absorbing landing gear system 10 (see FIG. 1) is overloaded or has absorbed additional load, which is more than it was designed to handle, such as due to a hard-landing load condition 46 (see FIG. 1) during a hard landing of the vertical landing apparatus 20 (see FIG. 1), and that an amount 201a (see FIG. 1) of the deformation 201 (see FIG. 1), or an amount 202a (see FIG. 1) of the irreversible deformation 202 (see FIGS. 1, 4C), shows an extent 44a (see FIG. 1) to which the load threshold 44 (see FIG. 1) of the linear damper assembly 12 (see FIG. 1) and the energy absorbing landing gear system 10 (see FIG. 1) were exceeded. For example, an indicator or a reference line on the cylinder 92 of the linear damper 70, such as the oil-gas damper 70a, may be used to visually indicate or show whether the cylinder 92 has moved or not. Such indicator or reference line may comprise a marking, a sticker, or another suitable indicator. Further, the load limiter assembly 14 having the at least one deformed element 131 (see FIGS. 4C, 5C) that is deformed, or irreversibly deformed, may be inspected, and replaced or exchanged with a load limiter assembly 14 having the at least one deformable element 130 (see FIGS. 4B, 5B) that is not damaged or irreversibly deformed. The deformed element 131 acts as a load fuse, and may be checked in each post-flight checklist, and serves as a visual instrumentation. Thus, the deformed element 131 is inspectable, exchangeable, replaceable, and provides visual information that the linear damper assembly 12 was overloaded. This limits or prevents the risk that a damaged vertical landing apparatus 20, such as an aircraft 20a, continues in operation because the visual indicator 208 of the deformed element 131 can be easily seen and noted. In addition, the deformed element 131 which serves, or functions, as the visual indicator 208 that deformation 201 (see FIG. 1), or irreversible deformation 202 (see FIG. 1), has occurred and the trigger load 204 (see FIG. 1) has been exceeded, decreases the time and expense of grounding the vertical landing apparatus 20, such as the aircraft 20a, and decreases the time and expense of determining whether or not damage has occurred to the vertical landing apparatus 20. Further, the load limiter assembly 14 is typically lighter in weight than the linear damper assembly 12, which is a reversible system. If extra margin on energy absorption is desired with known oil-gas dampers or reversible systems, larger reversible systems may be needed, which may result in unwanted additional weight to the system. Thus, if it is desired to increase the capacity to absorb energy, it is desirable to use a reversible system, such as a linear damper assembly 12, e.g., oil-gas damper, to cover design landing loads, and to add a replaceable deformation element, such as the load limiter assembly 14, to cover loads exceeding the design loads.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Any claimed version or embodiment of the disclosure does not necessarily include all of the versions or embodiments of the disclosure.

What is claimed is:

1. An energy absorbing landing gear system for attachment to a vertical landing apparatus, the energy absorbing landing gear system comprising:
a linear damper assembly; and
a load limiter assembly coupled to the linear damper assembly, the load limiter assembly having a tubular fitting incorporating at least one deformable element to enhance an energy absorption capability, the at least one deformable element comprising two deformable elements aligned opposite each other on the tubular fitting, each of the two deformable elements having a through opening, and the load limiter assembly further having a pin inserted through each through opening of the two deformable elements, and the pin further coupled to the linear damper assembly,
wherein when the energy absorbing landing gear system is attached to the vertical landing apparatus, during a landing phase, the linear damper assembly contacts a landing surface, and a piston assembly of the linear damper assembly moves a first compression distance toward the load limiter assembly, and
when the linear damper assembly reaches a maximum compression, the linear damper assembly moves a second compression distance into the load limiter assembly, and the at least one deformable element deforms, and
wherein when the linear damper assembly moves into the load limiter assembly, the pin tears through the two deformable elements to deform the two deformable elements.

2. The energy absorbing landing gear system of claim 1, wherein the linear damper assembly comprises:
a linear damper comprising one of, an oil-gas damper, a gas spring, a hydraulic shock absorber, or an elastic damper, and
a base member coupled to the linear damper, the base member interfacing with the landing surface during the landing phase of the vertical landing apparatus.

3. The energy absorbing landing gear system of claim 1, wherein the load limiter assembly is coupled in a series configuration to, and atop, the linear damper assembly.

4. The energy absorbing landing gear system of claim 1, wherein the at least one deformable element irreversibly deforms.

5. The energy absorbing landing gear system of claim 1, wherein the two deformable elements comprise machined vertical rectangles having a same shape and size.

6. The energy absorbing landing gear system of claim 1, wherein the pin is made of a pin material and the two deformable elements are made of a deformable element material, and the pin material has a strength and a load capacity that are greater than a strength and a load capacity of the deformable element material.

7. The energy absorbing landing gear system of claim 1, wherein the tubular fitting has an open top and an interior that is open, and the tubular fitting is configured to receive and house a cap element of the linear damper assembly.

8. The energy absorbing landing gear system of claim 1, wherein each of the two deformable elements has a thickness that is less than a thickness of a remaining portion of the tubular fitting that does not incorporate the two deformable elements.

9. The energy absorbing landing gear system of claim 1, wherein the at least one deformable element deforms to form at least one deformed element, and the at least one deformed element serves as a visual indicator that a load threshold of the linear damper assembly was exceeded.

10. A vertical landing apparatus comprising:
a structural frame; and
one or more energy absorbing landing gear systems, each attached to the structural frame, via one or more attachment members, and each of the one or more energy absorbing landing gear systems comprising:
a linear damper assembly comprising a linear damper having a piston assembly coupled to a base member; and
a load limiter assembly coupled to the linear damper assembly, the load limiter assembly having a tubular fitting incorporating at least one deformable element, the at least one deformable element comprising two deformable elements aligned opposite each other on the tubular fitting, each of the two deformable elements having a through opening, and the load limiter assembly further having a pin inserted through each through opening of the two deformable elements, and the pin further coupled to the linear damper assembly,
wherein during a landing phase, the base member of the linear damper assembly contacts a landing surface, and the piston assembly moves a first compression distance toward the load limiter assembly, and
wherein when the linear damper assembly reaches a maximum compression, the linear damper assembly moves a second compression distance into the load limiter assembly, and the at least one deformable element deforms, and
wherein when the linear damper assembly moves into the load limiter assembly, the pin tears through the two deformable elements to deform the two deformable elements.

11. The vertical landing apparatus of claim 10, wherein the vertical landing apparatus comprises one of, an aircraft, a vertical take-off and landing (VTOL) aircraft, a manned aircraft, an unmanned aerial vehicle (UAV), a rotorcraft, or an airdrop container configured to land in a vertical landing motion.

12. The vertical landing apparatus of claim 10, wherein the one or more energy absorbing landing gear systems comprise four energy absorbing landing gear systems attached to the structural frame, the four energy absorbing landing gear systems being in a vertical alignment with each other.

13. The vertical landing apparatus of claim 10, wherein the pin is made of a pin material and the two deformable elements are made of a deformable element material, and the pin material forming the pin has a strength and a load capacity that are greater than a strength and a load capacity of the deformable element material forming the two deformable elements.

14. The vertical landing apparatus of claim 10, wherein the two deformable elements comprise machined vertical rectangles having a same shape and size.

15. A method of using one or more energy absorbing landing gear systems attached to a vertical landing apparatus during a landing phase of the vertical landing apparatus, the method comprising the steps of:

operating the vertical landing apparatus to land in a vertical landing motion during the landing phase, the vertical landing apparatus having the one or more energy absorbing landing gear systems attached to a structural frame of the vertical landing apparatus, each of the one or more energy absorbing landing gear systems comprising:
- a linear damper assembly comprising a linear damper having a piston assembly coupled to a base member; and
- a load limiter assembly coupled to the linear damper assembly, the load limiter assembly having a tubular fitting incorporating at least one deformable element, the at least one deformable element comprising two deformable elements aligned opposite each other on the tubular fitting, each of the two deformable elements having a through opening, and the load limiter assembly further having a pin inserted through each through opening of the two deformable elements, and the pin further coupled to the linear damper assembly;

moving the piston assembly of the linear damper assembly of each of the one or more energy absorbing landing gear systems, a first compression distance toward the load limiter assembly, when the base member of each of the one or more energy absorbing landing gear systems contacts a landing surface during the landing phase;

moving the linear damper assembly of each of the one or more energy absorbing landing gear systems, a second compression distance into the load limiter assembly, when the linear damper assembly reaches a maximum compression; and deforming the at least one deformable element of each of the one or more energy absorbing landing gear systems, wherein when the linear damper assembly moves into the load limiter assembly, the pin tears through the two deformable elements to deform the two deformable elements.

16. The method of claim 15, wherein operating the vertical landing apparatus further comprises, operating one of, an aircraft, a vertical take-off and landing (VTOL) aircraft, a manned aircraft, an unmanned aerial vehicle (UAV), a rotorcraft, or an airdrop container configured to land in the vertical landing motion.

17. The method of claim 15 wherein operating the vertical landing apparatus having one or more energy absorbing landing gear systems further comprises, each comprising the load limiter assembly further comprising:
- the pin made of a pin material and the two deformable elements made of a deformable element material, wherein the pin material has a strength and a load capacity that are greater than a strength and a load capacity of the deformable element material.

18. The method of claim 15, wherein operating the vertical landing apparatus having one or more energy absorbing landing gear systems further comprises, operating the vertical landing apparatus having one or more energy absorbing landing gear systems, each comprising the load limiter assembly further comprising:
- the two deformable elements comprising machined vertical rectangles having a same shape and size.

19. The method of claim 15, wherein deforming the at least one deformable element, further comprises, obtaining at least one deformed element that serves as a visual indicator that a load threshold of the linear damper assembly was exceeded and the vertical landing apparatus experienced a hard-landing load condition.

20. The method of claim 15, wherein deforming the at least one deformable element, further comprises, irreversibly deforming the at least one deformable element.

* * * * *